(12) United States Patent
Chin et al.

(10) Patent No.: US 11,539,473 B2
(45) Date of Patent: Dec. 27, 2022

(54) METHODS AND APPARATUSES FOR HANDLING UPLINK (RE)TRANSMISSION IN NR-U

(71) Applicant: FG Innovation Company Limited, Tuen Mun (HK)

(72) Inventors: Heng-Li Chin, Taipei (TW); Hai-Han Wang, Taipei (TW); Hsin-Hsi Tsai, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 12 days.

(21) Appl. No.: 17/144,733

(22) Filed: Jan. 8, 2021

(65) Prior Publication Data

US 2021/0219322 A1 Jul. 15, 2021

Related U.S. Application Data

(60) Provisional application No. 62/959,736, filed on Jan. 10, 2020.

(51) Int. Cl.
*H04L 1/18* (2006.01)
*H04W 72/12* (2009.01)
*H04W 72/14* (2009.01)

(52) U.S. Cl.
CPC .......... *H04L 1/1822* (2013.01); *H04L 1/1893* (2013.01); *H04W 72/1284* (2013.01); *H04W 72/14* (2013.01)

(58) Field of Classification Search
None
See application file for complete search history.

(56) References Cited

U.S. PATENT DOCUMENTS

| 2017/0272199 A1 | 9/2017 | Dinan |
| 2018/0352537 A1 | 12/2018 | Zhang et al. |
| 2021/0105802 A1* | 4/2021 | Lee ........................ H04L 5/0053 |

(Continued)

FOREIGN PATENT DOCUMENTS

| CN | 105611637 | 5/2016 |
| CN | 106993334 | 7/2017 |
| CN | 109565870 | 4/2019 |

OTHER PUBLICATIONS

3GPP TS 38.331 V15.7.0 (Sep. 2019), Radio Resource Control (RRC) protocol specification (Release 15).

(Continued)

*Primary Examiner* — Marcus Smith
(74) *Attorney, Agent, or Firm* — ScienBiziP, P.C.

(57) ABSTRACT

A user equipment (UE) includes one or more non-transitory computer-readable media containing computer-executable instructions embodied therein, and at least one processor coupled to the one or more non-transitory computer-readable media. The at least one processor is configured to execute the computer-executable instructions to receive a dynamic grant for scheduling a first uplink (UL) resource, determine whether to obtain a first Medium Access Control (MAC) protocol data unit (PDU) for transmission using the first UL resource or to transmit a second MAC PDU before obtaining the first MAC PDU, and transmit the second MAC PDU using the first UL resource when the first UL resource is suitable for transmitting the second MAC PDU.

18 Claims, 9 Drawing Sheets

(56) References Cited

U.S. PATENT DOCUMENTS

2021/0153173 A1\*  5/2021  Baek ..................... H04L 5/0044
2021/0400710 A1\* 12/2021  Liu .................. H04W 72/1278

OTHER PUBLICATIONS

3GPP TS 38.213 V15.7.0, Physical layer procedures for control (Release 15).
3GPP TR 38.889 V16.0.0 (Dec. 2018), Study on NR-based access to unlicensed spectrum (Release 16).
3GPP TS 38.214 V15.7.0 (Oct. 2019), Physical layer procedures for data (Release 15).
3GPP TS 38.212 V15.7.0, Multiplexing and channel coding (Release 15).
3GPP TS 38.321 V15.7.0, Medium Access Control (MAC) protocol specification (Release 15).
3GPP TS 37.340 V15.7.0 (Sep. 2019), Multi-connectivity; Overall description; Stage 2 (Release 15).

\* cited by examiner

METHODS AND APPARATUSES FOR HANDLING UPLINK (RE)TRANSMISSION IN NR-U

CROSS-REFERENCE TO RELATED APPLICATION(S)

The present disclosure claims the benefit of and priority of provisional U.S. Patent Application Ser. No. 62/959,736, filed on Jan. 10, 2020, entitled "Method and Apparatus to Handle Uplink Transmission in NR-U" ("the '736 provisional"). The disclosure of the '736 provisional is hereby incorporated fully by reference into the present disclosure for all purposes.

FIELD

The present disclosure is related to wireless communication, and more particularly, to methods and apparatuses for handling uplink (re)transmission in NR-Unlicensed (NR-U).

BACKGROUND

New Radio (NR)-based access to unlicensed spectrum has been agreed by the 3rd Generation Partnership Project (3GPP) as one of the Work Items (WIs) for Release-16. This WI specifies NR enhancements for a single global solution framework for access to unlicensed spectrum which enables operations of NR in the unlicensed bands (e.g., 5 GHz and 6 GHz bands) taking into account of regional regulatory requirements. The NR-Unlicensed (NR-U) design should enable fair coexistence between already deployed Wireless-Fidelity (Wi-Fi) generations and NR-U, between NR-U and Long Term Evolution-License-Assisted Access (LTE-LAA), between different NR-U systems, etc.

The NR-U system is to enable the network to allocate, via a single dynamic uplink (UL) grant, multiple PUSCH resources to individual UEs. Since the UEs may need to perform Listen Before Talk (LBT) before each UL transmission, LBT failures and unsuccessful transmission (e.g., due to busy channel condition) may affect the transmission of packets using the multiple UL resources scheduled by the single dynamic grant. Thus, there exists a need for further improvements in the art.

CITATION LIST

Citation 1: 3GPP TR 38.889 V16.0.0; Study on NR-based access to unlicensed spectrum.
Citation 2: 3GPP TS 37.340 V15.7.0; Multi-connectivity; Overall description; Stage-2.
Citation 3: 3GPP TS 38.331 V15.7.0; Radio Resource Control (RRC) protocol specification.
Citation 4: 3GPP TS 38.214 V15.7.0; Physical layer procedures for data.
Citation 5: 3GPP TS 38.321 V15.7.0; Medium Access Control (MAC) protocol specification.
Citation 6: 3GPP TS 38.212 V15.7.0; Multiplexing and channel coding.
Citation 7: 3GPP TS 38.213 V15.7.0; Physical layer procedures for control.

SUMMARY

The present disclosure is related to methods and apparatuses for handling uplink (re)transmission in NR-U.

According to a first aspect of the present disclosure, a user equipment (UE) is provided. The UE includes one or more non-transitory computer-readable media containing computer-executable instructions embodied therein, and at least one processor coupled to the one or more non-transitory computer-readable media. The at least one processor is configured to execute the computer-executable instructions to receive a dynamic grant for scheduling a first uplink (UL) resource, determine whether to obtain a first Medium Access Control (MAC) protocol data unit (PDU) for transmission using the first UL resource or to transmit a second MAC PDU before obtaining the first MAC PDU, and transmit the second MAC PDU using the first UL resource if the first UL resource is suitable for transmitting the second MAC PDU.

In an implementation of the first aspect, if the first UL resource is not suitable for transmitting the second MAC PDU and if the first UL resource is indicated for a new transmission, obtaining the first MAC PDU comprises generating the first MAC PDU for the new transmission using the first UL resource.

In another implementation of the first aspect, if the first UL resource is not suitable for transmitting the second MAC PDU and if the first UL resource is indicated for a retransmission, obtaining the first MAC PDU comprises retrieving the first MAC PDU from a hybrid automatic repeat request (HARQ) buffer associated with a HARQ process of the first UL resource for the retransmission using the first UL resource.

In yet another implementation of the first aspect, the first UL resource is suitable for transmitting the second MAC PDU if at least one of the following conditions is satisfied: the second MAC PDU is generated for transmission using a second UL resource scheduled by the dynamic grant; the second UL resource is indicated for a new transmission; the second UL resource is before the first UL resource in a time domain; the size of the first UL resource is equal to or greater than the size of the second UL resource; the second MAC PDU is not transmitted successfully on the second UL resource due to a UL Listen-Before-Talk (LBT) failure; and the second UL resource associated with a second hybrid automatic repeat request (HARQ) process identifier (ID) is different from a first HARQ ID associated with the first UL resource.

In yet another implementation of the first aspect, the second MAC PDU is stored in a HARQ buffer after being generated, and the HARQ buffer is associated with a HARQ process of the second UL resource.

In yet another implementation of the first aspect, the at least one processor is further configured to execute the computer-executable instructions to: obtain the second MAC PDU from the HARQ buffer for transmission using the first UL resource.

In yet another implementation of the first aspect, the dynamic grant further schedules a second UL resource, the first UL resource is immediately after the second UL resource in a time domain.

In yet another implementation of the first aspect, wherein the first UL resource and the second UL resource are physical uplink shared channel (PUSCH) resources.

In yet another implementation of the first aspect, a size of the first UL resource is equal to or greater than a size of the second UL resource.

In yet another implementation of the first aspect, the dynamic grant is received in downlink control information (DCI).

According to a second aspect of the present disclosure, a method for wireless communication performed by a UE is provided. The method includes receiving a dynamic grant for scheduling a first uplink (UL) resource, determining whether to obtain a first Medium Access Control (MAC) protocol data unit (PDU) for transmission using the first UL resource or to transmit a second MAC PDU before obtaining the first MAC PDU, and transmitting the second MAC PDU using the first UL resource if the first UL resource is suitable for transmitting the second MAC PDU.

In an implementation of the second aspect, if the first UL resource is not suitable for transmitting the second MAC PDU and if the first UL resource is indicated for a new transmission, obtaining the first MAC PDU comprises generating the first MAC PDU for the new transmission using the first UL resource.

In another implementation of the second aspect, if the first UL resource is not suitable for transmitting the second MAC PDU and if the first UL resource is indicated for a retransmission, obtaining the first MAC PDU comprises retrieving the first MAC PDU from a hybrid automatic repeat request (HARQ) buffer associated with a HARQ process of the first UL resource for the retransmission using the first UL resource.

In yet another implementation of the second aspect, the first UL resource is suitable for transmitting the second MAC PDU if at least one of the following conditions is satisfied: the second MAC PDU is generated for transmission using a second UL resource scheduled by the dynamic grant; the second UL resource is indicated for a new transmission; the second UL resource is before the first UL resource in a time domain; the size of the first UL resource is equal to or greater than the size of the second UL resource; the second MAC PDU is not transmitted successfully on the second UL resource due to a UL Listen-Before-Talk (LBT) failure; and the second UL resource associated with a second hybrid automatic repeat request (HARQ) process identifier (ID) is different from a first HARQ ID associated with the first UL resource.

In yet another implementation of the second aspect, the second MAC PDU is stored in a HARQ buffer after being generated, and the HARQ buffer is associated with a HARQ process of the second UL resource.

In yet another implementation of the second aspect, the method further includes obtaining the second MAC PDU from the HARQ buffer for transmission using the first UL resource.

In yet another implementation of the second aspect, the dynamic grant further schedules a second UL resource, the first UL resource is immediately after the second UL resource in a time domain.

In yet another implementation of the second aspect, the first UL resource and the second UL resource are physical uplink shared channel (PUSCH) resources.

In yet another implementation of the second aspect, a size of the first UL resource is equal to or greater than a size of the second UL resource.

In yet another implementation of the second aspect, the dynamic grant is received in downlink control information (DCI).

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
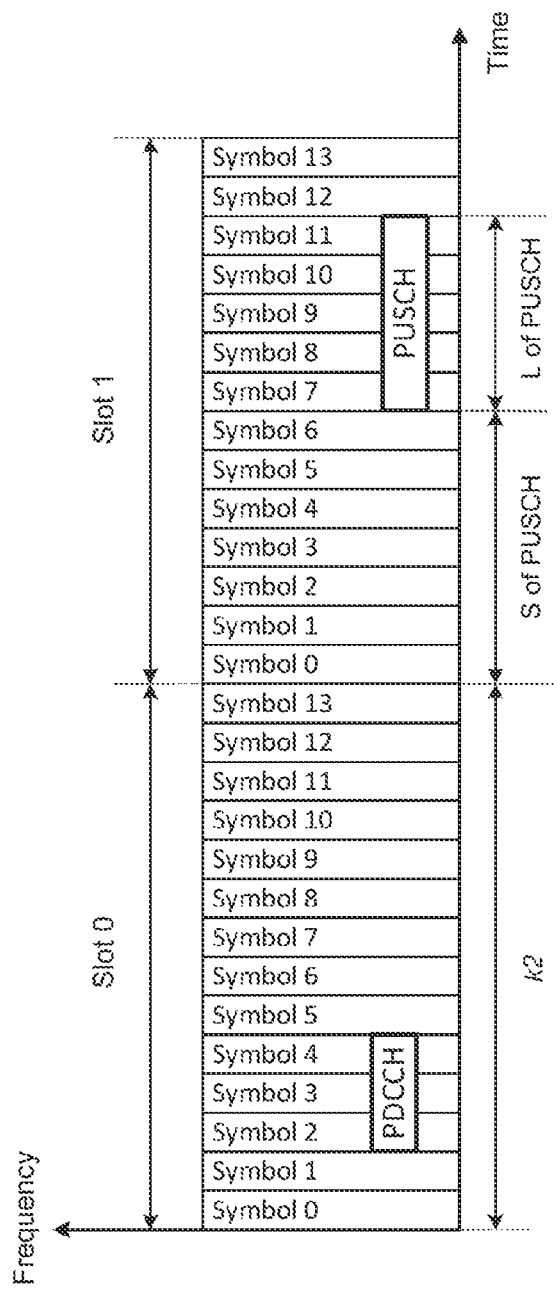
FIG. 1 illustrates a time-domain relationship between one PDCCH to one PUSCH resource allocation, in accordance with an example implementation of the present disclosure.

The acronyms used in the present disclosure are defined as follows. Unless otherwise specified, the acronyms have the following meanings.

| Acronym | Full Name |
| --- | --- |
| 3GPP | $3^{rd}$ Generation Partnership Project |
| 5G | $5^{th}$ Generation |
| 5GC | $5^{th}$ Generation Core |
| ACK | Acknowledgment |
| BFR | Beam Failure Recovery |
| BSR | Buffer Status Report |
| BWP | Band Width Part |
| CAPC | Channel Access Priority Class |
| CBRA | Contention Based Random Access |
| CC | Component Carrier |
| CCCH | Common Control Channel |
| CE | Control Element |
| CG | Cell Group |
| COT | Channel Occupancy Time |
| C-RNTI | Cell Radio Network Temporary Identifier |
| CSI | Channel State information |
| DC | Dual Connectivity |
| DCCH | Dedicated Control Channel |
| DCI | Downlink Control Information |
| DL | Downlink |
| E-UTRAN | Evolved Universal Terrestrial Radio Access Network |
| EPC | Evolved Packet Core |
| HARQ | Hybrid Automatic Repeat Request |
| LAA | Licensed Assisted Access |
| LBT | Listen Before Talk |
| LCP | Logical Channel Prioritization |
| LTE | Long Term Evolution |
| MAC | Medium Access Control |
| MCG | Master Cell Group |
| MCOT | Maximum Channel Occupancy Time |
| MIMO | Multi-input Multi-output |
| MN | Master Node |
| NDI | New Data Indicator |
| NR | New RAT/Radio |

-continued

| Acronym | Full Name |
| --- | --- |
| NR-U | New Radio Unlicensed |
| PCell | Primary Cell |
| PSCell | Primary Secondary Cell |
| PDCCH | Physical Downlink Control Channel |
| PDSCH | Physical Downlink Shared Channel |
| PDU | Protocol Data Unit |
| PHY | Physical |
| PHR | Power Head Room |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAR | Random Access Response |
| RLF | Radio Link Failure |
| RRC | Radio Resource Control |
| SCell | Secondary Cell |
| SCG | Secondary Cell Group |
| SpCell | Special Cell |
| SR | Scheduling Request |
| SRB | Signaling Radio Bearer |
| SRS | Sounding Reference Signal |
| TAG | Timing Advance Group |
| TB | Transport Block |
| TBS | Transport Block Size |
| TDD | Time Division Duplex |
| TDRA | Time Domain Resource Allocation |
| TR | Technical Report |
| TS | Technical Specification |
| TX | Transmission |
| UE | User Equipment |
| UCI | Uplink Control Information |
| UL | Uplink |
| WG | Working Group |
| WI | Working Item |

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Primary Cell (PCell): For dual connectivity (DC) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise the term Special Cell refers to the PCell.

Secondary Cell: For a UE configured with carrier aggregation (CA), a cell providing additional radio resources on top of Special Cell.

Serving Cell: For a UE in RRC_CONNECTED not configured with CA/DC, there is only one serving cell, which may be referred to as the primary cell. For a UE in RRC_CONNECTED configured with CA/DC, the term "serving cells" may be used to denote the set of cells including the SpCell(s) and all secondary cells.

Listen Before Talk (LBT) is a feature available in Wi-Fi that allows coexistence with other Wi-Fi nodes. LBT is a mechanism by which an equipment applies clear channel assessment (CCA) before using the channel. The 3rd Generation Partnership Project (3GPP) chose to specify a conservative LBT scheme similar to what Wi-Fi nodes use in order to ensure coexistence of Licensed Assisted Access (LAA) with Wi-Fi. LAA uses carrier aggregation in DL to combine LTE in the unlicensed spectrum (e.g., 5 GHz) with LTE in the licensed band. In NR, LBT may be also required prior to any transmission when operating on the unlicensed spectrum.

In an unlicensed spectrum, a UE may perform channel access before performing a transmission in order to make sure that there is no other device occupying the channel where the transmission is intended to be performed. For channel access mechanism in NR-U operations, the LTE-LAA LBT mechanism may be adopted as the baseline for 5 GHz band and as the starting point of the design for 6 GHz band. At least for bands where absence of Wi-Fi cannot be guaranteed (e.g., by regulation), LBT may be performed in units of 20 MHz. In general, there are 4 LBT categories. The introduction of each LBT category may be found below. For NR-U operations, a UE may perform LBT using one of the 4 LBT categories before performing an UL transmission for different transmissions in a COT (as defined below) and different channels/signals to be transmitted. Specifically, a UE may perform LBT using different LBT categories before performing PRACH, PUCCH, PUSCH and SRS transmissions.

Category 1: Immediate Transmission after a Short Switching Gap

This may be used for a transmitter to immediately transmit after a switching gap inside a COT. More specifically, the switching gap from reception to transmission is to accommodate the transceiver turnaround time and is no longer than 16 μs.

Category 2: LBT without Random Back-Off

The duration of time that the channel (where transmission is intended to be performed) is sensed to be idle before the transmitting entity transmits is deterministic.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel (where transmission is intended to be performed) is sensed to be idle before the transmitting entity transmits on the channel.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel (where transmission is intended to be performed) is sensed to be idle before the transmitting entity transmits on the channel.

The transmission may be performed by a UE only if the LBT is successful, for example, as explained in each of the LBT categories discussed above. Moreover, the maximum continuous transmission time (upon successful LBT) may be predetermined by a COT value. Based on the concept of LBT mechanism, RAN Working Group 2 (WG2) has agreed to assume that the configured grant timer, which corresponds to the HARQ process of a PUSCH resource of a configured uplink grant is not (re)started if transmission is not performed on a PUSCH resource due to an LBT failure (e.g., LBT is not successful). RAN WG2 also assumes that a pending transport block (TB), which has not been transmitted on a configured uplink grant resource due to an LBT failure, may be (re)transmitted in a (subsequent) configured uplink grant resource (with the same HARQ process).

NR Radio Access operating in Unlicensed Spectrum can operate in a PCell, an SCell, or a PSCell. In stand-alone mode, all cells are in unlicensed spectrum. In another scenario, the NR-U SCells may be operated in unlicensed spectrum whilst the PCell is operated in licensed spectrum. An NR-U SCell may or may not be configured with UL resources. The DC-type of operation can be configured either with an E-UTRAN node (connected to EPC or 5GC) as a master node (MN) or with an NR node, as described in Citation 2.

gNBs and UEs may apply LBT before performing a transmission (e.g., a UL or DL transmission) on NR-U cells. When LBT is applied, the transmitter (e.g., a gNB or a UE) listens/senses the channel to determine whether the channel is idle or busy. The transmitter may perform transmission only if the channel is sensed idle.

LBT may be considered successful if the channel is sensed to be idle (e.g., the power detected by a UE, which intends to perform a UL transmission, is less than a predetermined/configured power threshold) for a predetermined/configured duration of time during an LBT procedure, if LBT category 2/3/4 is performed. LBT may be considered successful if the UE performs LBT category 1. Otherwise, an LBT failure may be considered. The MAC entity of the UE may receive an LBT failure indication from the PHY layer of the UE upon one/multiple LBT failure(s). The transmission may be performed by a UE only if the LBT is successful (e.g., as explained under each LBT category as shown above). Moreover, the maximum continuous transmission time (upon successful LBT) may be predetermined by a COT value.

In various implementations of the present disclosure, the term "UL LBT" may be referred to an LBT procedure performed by the UE before an UL transmission. The term "DL LBT" may be referred to an LBT procedure performed by the network before an DL transmission.

Multi-Transmit Time Interval (Multi-TTI) UL Grant

Since a UE may need to perform LBT independently before each UL transmission, the chances of LBT failures and unsuccessful transmissions, due to busy channel condition, are inevitable. To reduce the impact of LBT failures and unsuccessful transmissions, the NR-U system enables the network to allocate, via a single dynamic grant, multiple PUSCH resources to individual UEs. Such a grant may be referred to as a multi-TTI UL grant in the present disclosure. A UE may initiate transmission of multiple TBs on multiple PUSCH resources scheduled by a single multi-TTI UL grant from a time instance where LBT succeeds until the last PUSCH resource allocated by the same multi-TTI UL grant. As a result, the number of LBT operations and the impact from LBT failures may be reduced.

The network may configure a PUSCH TDRA list (e.g., via a pusch-TimeDomainAllocationList-r16 IE) to a UE via RRC signaling. The PUSCH TDRA list may contain one or more rows.

In one implementation, a row of the PUSCH TDRA list may include a time-domain relationship between one PDCCH and one PUSCH resource allocation. This row may include a parameter, k2, to indicate an offset (e.g., in number of slots/symbols) between the PDCCH and the PUSCH resource allocation in the time domain. Additionally, this row may include a parameter, startSymbolAndLength. The startSymbolAndLength value may be mapped to the starting symbol (S) of the PUSCH resource allocation on the slot/symbol derived from k2, as well as the length (L) (in number of slots/symbols) of the PUSCH resource allocation in the time domain.

FIG. 1 illustrates a time-domain relationship between one PDCCH to one PUSCH resource allocation, in accordance with an example implementation of the present disclosure. As illustrated in FIG. 1, a PDCCH is schedule in slot 0. The value of k2 (with a value of 1) is used to indicate an offset (e.g., in number of slots or symbols) between the PDCCH resource and the PUSCH resource. Additionally, a startSymbolAndLength value is indicated to the UE. The UE may derive the value of starting symbol and length (e.g., in number of symbols) from the startSymbolAndLength. In the present implementation, the derived starting symbol and length are 7 and 5, respectively. That is, the PUSCH resource is scheduled in slot 1 (k2=1) at symbol 7 (S=7), and has a duration of 5 symbols (L=5).

In another implementation, a row of the PUSCH TDRA list may include a time-domain relationship between one PDCCH and multiple PUSCH resource allocations (e.g., that are contiguous in the time domain). This row may include a parameter, k2, to indicate an offset (in number of slots/symbols) between the PDCCH and the (earliest) PUSCH resource allocation in the time domain. Additionally, this row may include more than one startSymbolAndLength value (e.g., up to 8 startSymbolAndLength values). Each startSymbolAndLength value may correspond to one PUSCH resource allocation. For instance, if startSymbolAndLength_A corresponds to PUSCH resource A, the starting symbol (S) and the length (L) (in number of slots/symbols) of PUSCH resource A may be derived from startSymbolAndLength_A.

Figure 2:
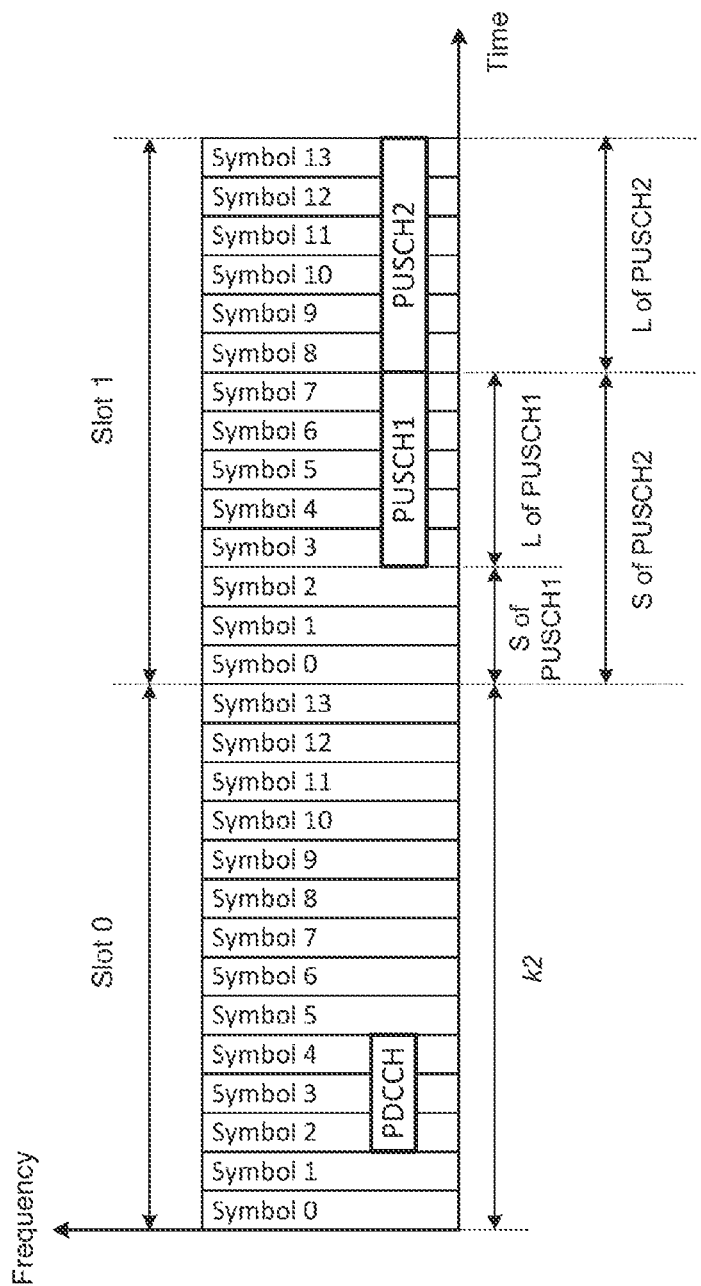
FIG. 2 illustrates a time-domain relationship between one PDCCH to two PUSCHs resource allocation, in accordance with an example implementation of the present disclosure.

FIG. 2 illustrates a time-domain relationship between one PDCCH to two PUSCHs resource allocation, in accordance with an example implementation of the present disclosure. As illustrated in FIG. 2, a PDCCH is schedule in slot 0, and PUSCH 1 and PUSCH 2 are scheduled in slot 1. The value of k2 (with a value of 1) is used to indicate an offset (e.g., in number of slots or symbols) between the PDCCH resource and PUSCH 1 (e.g., the earliest PUSCH resource allocation in the time domain). Additionally, 2 startSymbolAndLength values are included in this row, namely startSymbolAndLength_1 and startSymbolAndLength_2. The startSymbolAndLength_1 may be used to derive a starting symbol (S) and a length (L) (in number of symbols) of PUSCH 1. The startSymbolAndLength_2 may be used to derive a starting symbol (S) and a length (L) (e.g., in number of symbols) of PUSCH 2. As shown in FIG. 2, the derived starting symbol of PUSCH 1 is 3 (S=3) and the length of PUSCH 1 is 5 (L=5). The derived starting symbol of PUSCH 2 is 8 (S=8) and the length of PUSCH 2 is 6 (L=6).

Subsequently, the network may signal a multi-TTI UL grant to the UE. The multi-TTI UL grant may be signaled on a PDCCH. The bit field (e.g., TDRA field) of this multi-TTI UL grant may be used to indicate which row of the earlier configured PUSCH TDRA list should be applied by the UE. Based on the row as indicated by the multi-TTI UL grant, the UE may apply the k2 and startSymbolAndLength(s) values from the indicated row to determine the time-domain offset between the PDCCH where the multi-TTI UL grant is received, as well as the starting symbol(s) and length(s) of the corresponding PUSCH resource allocation(s).

A multi-TTI UL grant may use the same DCI format as a dynamic grant that schedules a single PUSCH resource (e.g., DCI format 0-1). Moreover, CRC bits of a multi-TTI UL grant may be scrambled by the C-RNTI of the receiving UE (which is the same for a dynamic grant that schedules a single PUSCH resource). However, the bit field (i.e., TDRA field) of a multi-TTI UL grant may only indicate a specific row of the earlier configured PUSCH TDRA list. Here, the specific row may be referred to as a row that includes the time-domain relationship between one PDCCH and multiple PUSCH resource allocations, e.g., a row which includes one k2 and more than one startSymbolAndLength values.

The PUSCH resources scheduled or allocated by a multi-TTI UL grant may have different HARQ process IDs. For example, the DCI field of a multi-TTI UL grant may indicate only the HARQ process ID of the earliest PUSCH allocation in the time domain. The default HARQ process IDs for subsequent PUSCH(s) are then incremented by one in the scheduled order (with modulo operation if needed). For example, if a multi-TTI UL grant allocates 3 PUSCH resources (e.g., PUSCH 1, PUSCH 2, and PUSCH 3 in the scheduled order), the DCI field of this multi-TTI UL grant may only indicate the HARQ process ID of PUSCH 1. If the indicated HARQ process ID of PUSCH 1 is j, the HARQ process IDs of PUSCH 2 and PUSCH 3 are j+1 and j+2, respectively, which may be derived by the UE itself.

The NDI may be explicitly indicated for each PUSCH resource scheduled by a multi-TTI UL grant. The network may indicate, via a single multi-TTI UL grant, PUSCH resource(s) for new transmission (e.g., the NDI for the HARQ process of the PUSCH resource for new transmission may have been toggled compared to the value of previous received transmission with the same HARQ process) and/or PUSCH resource(s) for retransmission (e.g., the NDI for the HARQ process of the PUSCH resource for retransmission may not have been toggled compared to the value of previous received transmission with the same HARQ process).

When a UE receives a multi-TTI UL grant that indicates multiple PUSCH resource allocations, the UE may perform LBT before transmission on an allocated PUSCH resource. However, instead of being required to perform LBT for each allocated PUSCH resource independently, a UE may initiate the transmission on multiple PUSCHs from the point in time where LBT succeeds until the last PUSCH resource allocated by the same multi-TTI UL grant. In contrast, when LBT fails (e.g., a UE receives an LBT failure indication) before transmission on a PUSCH resource, the UE may map the generated TB for the corresponding PUSCH resource to a different HARQ process. In another word, if LBT fails (e.g., a UE receives an LBT failure indication) before transmission on a PUSCH scheduled by a multi-TTI UL grant, the UE may transmit the generated TB, which was intended for transmission on this PUSCH, in a different PUSCH resource (scheduled by the same multi-TTI UL grant) that associates with a different HARQ process ID. In one example, a UE may receive a multi-TTI UL grant from the network allocating PUSCH 1. Consequently, if the UE fails to perform transmission on PUSCH 1 due to LBT failure (e.g., the UE receives an LBT failure indication before the PUSCH 1 transmission), the UE may transmit the generated TB, which was intended to be transmitted on PUSCH 1, on another PUSCH resource (scheduled by the same multi-TTI UL grant) that associates with a different HARQ process ID.

LBT Failure and Recovery Mechanism

In the present implementation, a counter (LBT_COUNTER), a timer (lbt-FailureDetectionTimer), and a threshold (lbt-FailureInstanceMaxCount) may be introduced to a UL LBT failure mechanism. In addition, the LBT_COUNTER, lbt-FailureDetectionTimer, and lbt-FailureInstanceMaxCount may be configured/maintained per BWP/cell/CG/subset of a CG. The LBT_COUNTER may be initially set to zero upon (re)configuration and may be incremented by one by the UE when a UL LBT failure happens or when an LBT failure indication is received from the PHY layer. Specifically, the UL LBT failure may be caused by any (or specific) UL transmission type. For example, the LBT_COUNTER may be incremented by one when any (or specific) type of UL transmissions cannot be performed due to the detection of a UL LBT failure. In one example, the LBT_COUNTER may be incremented by one for each UL LBT failure(s) detected by the UE.

The lbt-FailureDetectionTimer may be configured by the network to the UE. It may be (re)started when any (or specific) type of UL transmission cannot be performed due to a UL LBT failure. Alternatively, the lbt-FailureDetectionTimer may be (re)started by the UE whenever the LBT_COUNTER is incremented. The LBT_COUNTER may be reset (e.g., set to zero) when the lbt-FailureDetectionTimer expires.

If the LBT_COUNTER (maintained at a serving cell) reaches the lbt-FailureInstanceMaxCount, it implies that consistent UL LBT failures are detected (on an UL BWP of the serving cell). Consequently, an LBT recovery procedure may be initiated by the UE. The LBT recovery procedure may be performed in different ways depending on which (UL BWP and/or) serving cell the (consistent) UL LBT failures are detected.

In one implementation, if consistent UL LBT failures are detected on a BWP of a PCell (e.g., the LBT_COUNTER reaches lbt-FailureInstanceMaxCount for the corresponding UL BWP of the PCell), a PCell LBT recovery procedure may be initiated, which involves triggering of consistent UL LBT failures for the corresponding UL BWP and initiation of an RA procedure on another BWP (on the PCell) configured with PRACH resources (e.g., UE-initiated BWP switching to a BWP configured with PRACH occasion), and for which consistent UL LBT failures has not been triggered. Additionally, an LBT failure MAC CE (which identifies the failed Cell and/or BWP) may be reported to the network as part of the PCell LBT recovery procedure (e.g., on a PUSCH scheduled by an UL grant from RAR). However, if consistent UL LBT failures have been triggered on all of the BWPs (or a BWP_declaration_counter has reached a configured BWP_declaration_threshold, as described below) on the PCell with configured PRACH resources (e.g., PRACH occasion), an RLF may be triggered as described in Citation 3.

Figure 3:
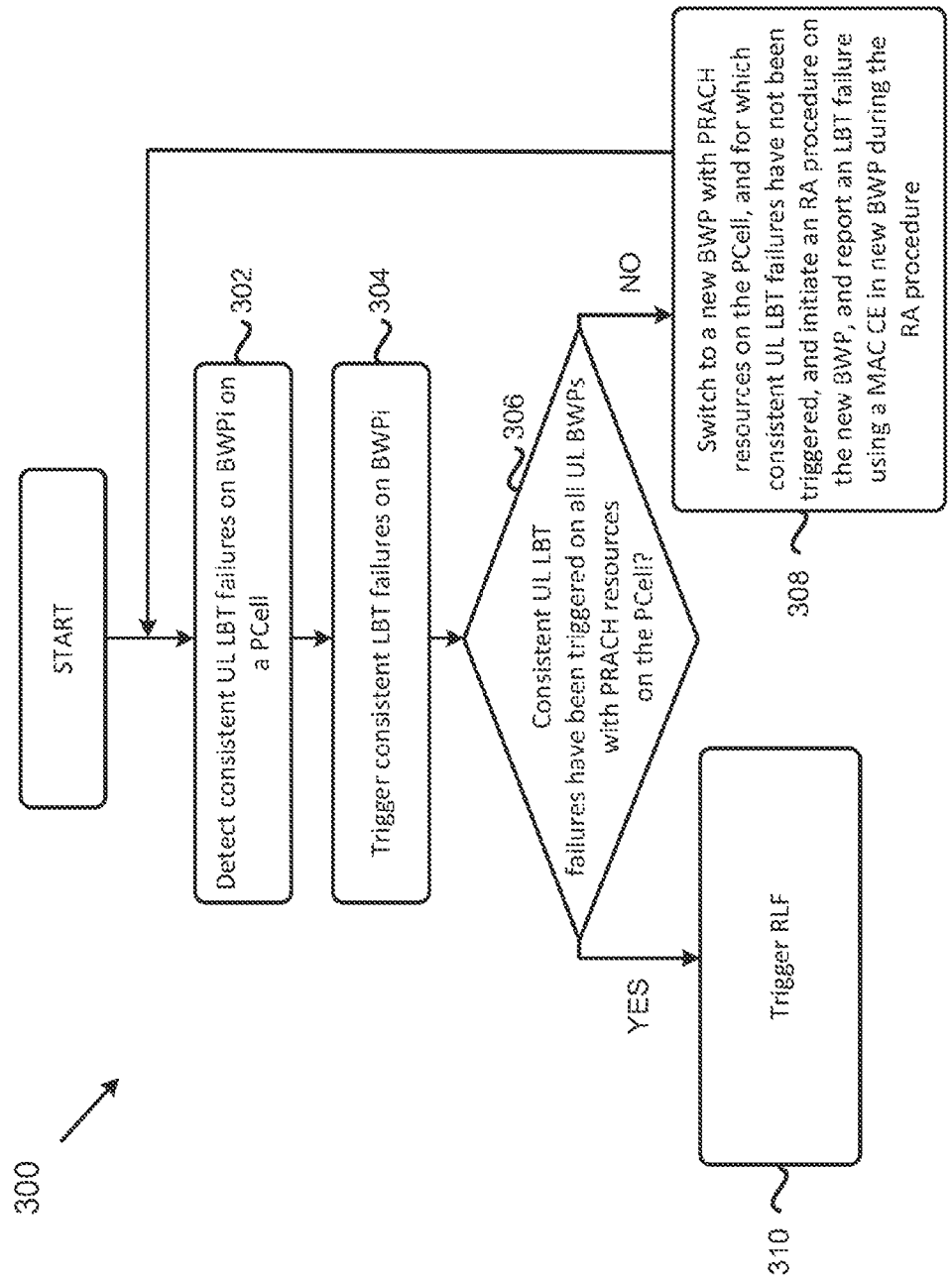
FIG. 3 illustrates a flowchart of a method by a UE for an LBT failure and recovery procedure, according to an example implementation of the present disclosure.

FIG. 3 illustrates a flowchart 300 of a method by a UE for an LBT failure and recovery procedure, according to an example implementation of the present disclosure. As shown in FIG. 3, in action 302, the UE may detect consistent UL LBT failures on a BWP ($BWP_i$) on a serving cell (e.g., a PCell). For example, the LBT counter maintained for this serving PCell reaches the MaxLBT threshold. In action 304, the UE may trigger consistent UL LBT failures of the $BWP_i$ on the PCell. In action 306, the UE may determine whether the consistent UL LBT failures have been triggered in all UL BWPs with PRACH resources on the serving PCell.

In action 308, if the consistent UL LBT failures have not been triggered in all UL BWPs with the PRACH resources on the serving PCell, the UE may switch to a new BWP with PRACH resources on the serving PCell and for which consistent UL LBT failures have not been triggered. The UE may initiate a random access (RA) procedure on the new BWP, and report the LBT failure using a MAC CE (e.g., LBT failure MAC CE) in the new BWP during the RA procedure. The UE may also re-initialize any suspended configuration(s) on the new UL BWP. The flowchart 300 may then proceed from action 308 to action 302.

In action 310, if the consistent UL LBT failures have been triggered in all UL BWPs with PRACH resources on the serving PCell, the UE may trigger a radio link failure (RLF) procedure for the PCell.

In another implementation, if consistent UL LBT failures are detected on a BWP on the PSCell (e.g., the LBT_COUNTER reaches the lbt-FailureInstanceMaxCount for the corresponding UL BWP of the PSCell), a PSCell LBT recovery procedure may be initiated. The PSCell LBT recovery procedure may include a triggering of consistent UL LBT failures for the corresponding UL BWP and an initiation of an RA procedure on another BWP (on the PSCell) configured with PRACH resources (e.g., UE-initiated BWP switching to a BWP configured with PRACH occasion), and for which consistent UL LBT failures has not been triggered. Additionally, an LBT failure MAC CE (which identifies the failed Cell and/or BWP) may be reported to the network as part of the PSCell LBT recovery procedure. However, if consistent UL LBT failures have been triggered on all the (or a BWP_declaration_counter has reached a configured BWP_declaration_threshold, as described below) BWPs on the PSCell with configured PRACH resources (e.g., PRACH occasion), a procedure to report SCG failure information may be initiated as described in Citation 3.

Figure 4:
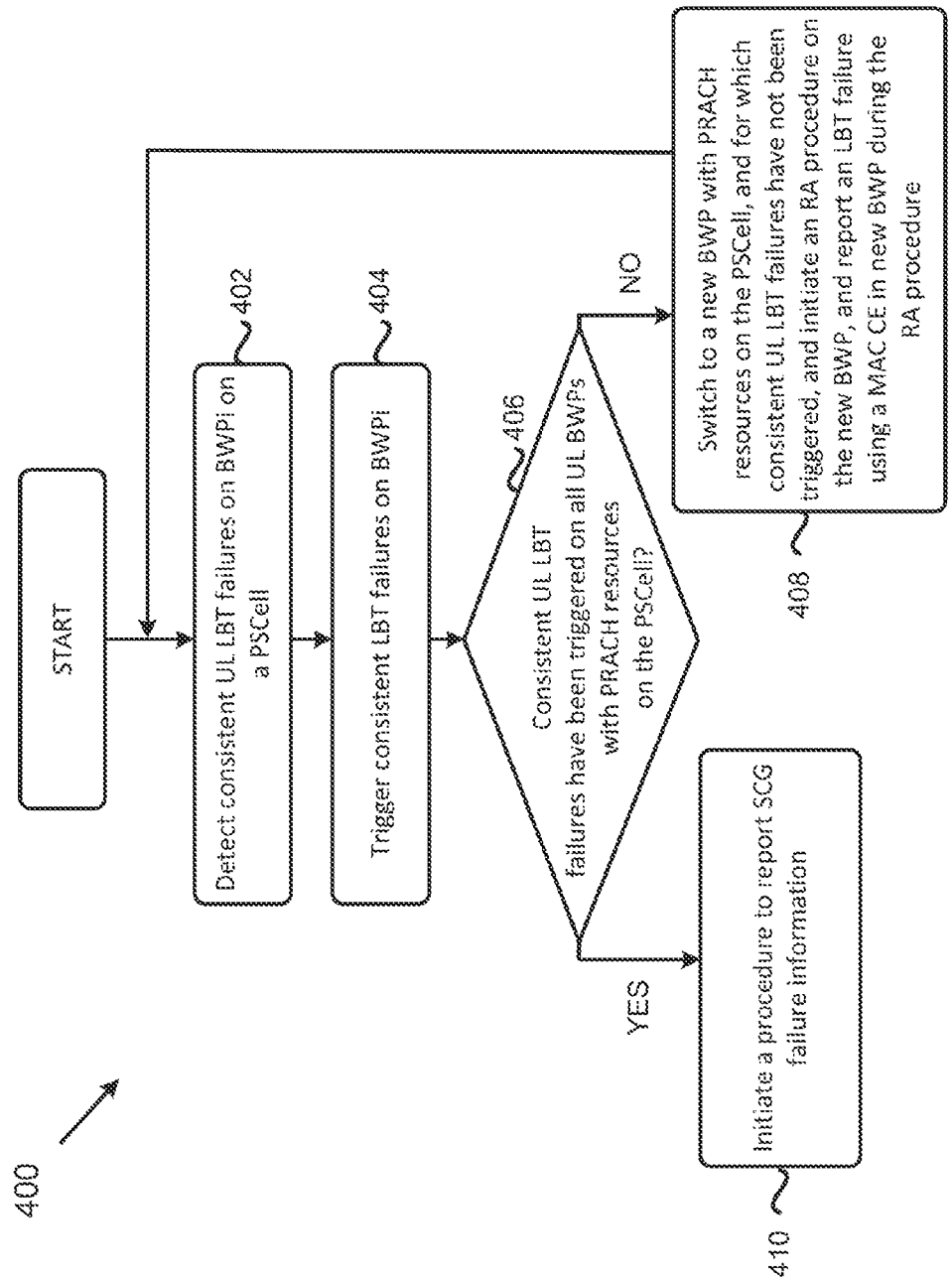
FIG. 4 illustrates a flowchart of a method by a UE for an LBT failure and recovery procedure, according to an example implementation of the present disclosure.

FIG. 4 illustrates a flowchart 400 of a method by a UE for an LBT failure and recovery procedure, according to an example implementation of the present disclosure. As shown in FIG. 4, in action 402, the UE may detect consistent UL LBT failures on a BWP ($BWP_i$) on a serving cell (e.g., a PSCell). For example, the LBT counter maintained for this serving PSCell reaches the MaxLBT threshold. In action 404, the UE may trigger consistent UL LBT failures of the $BWP_i$ on the PSCell. In action 406, the UE may determine whether the consistent UL LBT failures have been triggered in all UL BWPs with PRACH resources on the serving PSCell.

In action 408, if the consistent UL LBT failures have not been triggered in all UL BWPs with the PRACH resources on the serving PSCell, the UE may switch to a new BWP with PRACH resources on the serving PSCell and for which consistent UL LBT failures have not been triggered. The UE may initiate an RA procedure on the new BWP, and report the LBT failure using a MAC CE (e.g., an LBT failure MAC CE) in the new BWP during the RA procedure (e.g., on a PUSCH scheduled by an UL grant from RAR). The UE may also re-initialize any suspended configuration(s) on the new UL BWP. The flowchart 400 may then proceed from action 408 to action 402.

In action 410, if the consistent UL LBT failures have been triggered in all UL BWPs with PRACH resources on the serving PSCell, the UE may initiate a procedure to report SCG failure information.

In one implementation, the BWP_declaration_counter may be initially set to zero upon (re-)configuration. The BWP_declaration_counter may be maintained per cell (or per CG/subset of CG) in order to count the number of BWPs that have been triggered with consistent UL LBT failures for the corresponding cell. The BWP_declaration_counter (corresponding to a serving cell) may be incremented (by one) each time a BWP (of a serving cell) has been triggered as an invalid BWP (e.g., consistent uplink LBT failures happens on the BWP of a serving cell).

On the other hand, the BWP_declaration_threshold may be configured per cell (or per CG/subset of CG). The threshold may be used to define the maximum number of BWPs (of a serving cell) that may be triggered as an invalid BWP before the UE triggers the RLF procedure as described in Citation 3 or report SCG failure information as described in Citation 3 as part of the LBT failure recovery procedure.

In one example, if the value of BWP_declaration_counter (corresponding to the PCell) has reached a BWP_declaration_threshold for the PCell, an RLF may be triggered as described in Citation 3.

In one example, if the value of BWP_declaration_counter (corresponds to the PSCell) has reached a BWP_declaration_threshold for the PSCell, a procedure to report SCG failure information may be initiated as described in Citation 3.

In one example, the BWP_declaration_threshold configured for a serving cell may be configured to be equal to the number of BWPs configured with PRACH resources (e.g., PRACH occasion) of the serving cell.

In one implementation, if consistent UL LBT failure(s) is detected on a BWP on an SCell (e.g., the LBT_COUNTER reaches lbt-FailureInstanceMaxCount for the corresponding UL BWP), an SCell LBT recovery procedure may involve triggering of consistent UL LBT failures for the corresponding BWP and reporting an LBT failure MAC CE (which identifies the failed Cell and/or BWP) to the network.

Figure 5:
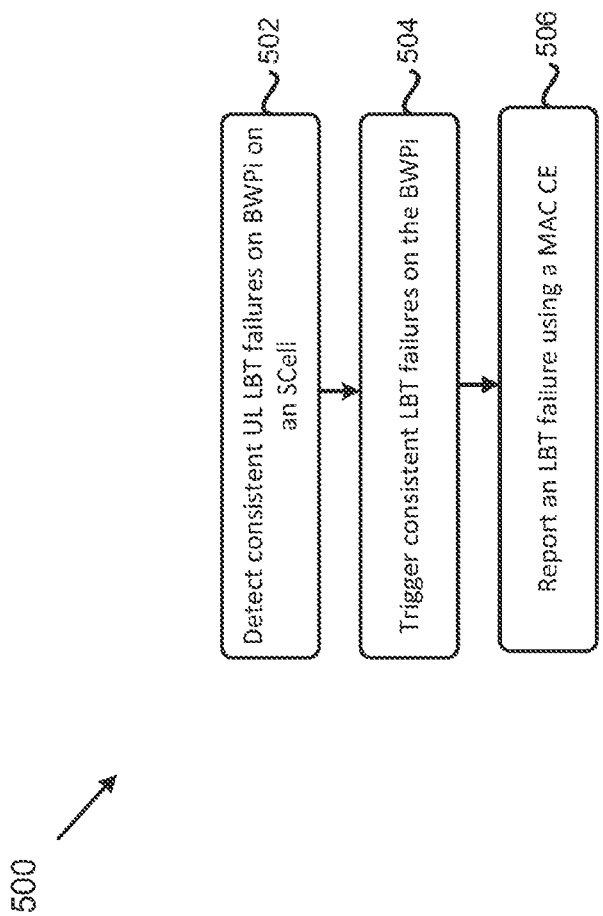
FIG. 5 illustrates a flowchart of a method by a UE for an LBT failure and recovery procedure, according to an example implementation of the present disclosure.

FIG. 5 illustrates a flowchart 500 of a method by a UE for an LBT failure and recovery procedure, according to an example implementation of the present disclosure. In action 502, the UE may detect consistent UL LBT failures on a BWP ($BWP_i$) on a serving cell (e.g., an SCell). For example, the LBT counter maintained for this serving SCell reaches the MaxLBT threshold. In action 504, the UE may trigger consistent UL LBT failures on the $BWP_i$. In action 506, the UE may report an LBT failure using a MAC CE (e.g., an LBT failure MAC CE).

In one implementation, a UE may report an LBT failure MAC CE when consistent UL LBT failures has been detected on a BWP of a SCell or a SpCell. Such a reporting mechanism may include triggering an LBT failure MAC CE(s) (by a BWP or/and serving cell) upon the detection of consistent uplink LBT failures on the BWP. Moreover, a triggered LBT failure MAC CE(s) may be considered as pending until it is being cancelled. Subsequently, if an UL resource (e.g., a PUSCH resource) becomes available for the transmission of an LBT failure MAC CE, a UE may generate an LBT failure MAC CE if there is triggered and pending LBT failure MAC CE(s). The generated LBT failure MAC CE may include information of the BWP and/or serving cell where consistent uplink LBT failures has been detected. For example, the format of the LBT failure MAC CE may be a bitmap to indicate if a corresponding serving cell has triggered consistent UL LBT failures. On the other hand, if there is no UL resource for transmitting the LBT failure MAC CE when there is triggered and pending LBT failure MAC CE(s), the UE may trigger an SR.

In one implementation, the triggered LBT failure MAC CE(s) prior to a MAC PDU assembly may be cancelled when a MAC PDU is transmitted, and this MAC PDU includes an LBT failure MAC CE (plus its subheader) which contains LBT information of the BWP(s) and/or serving cell(s) that triggered the LBT failure MAC CE(s) prior to the MAC PDU assembly.

In one implementation, all triggered LBT failure MAC CE(s) prior to a MAC PDU assembly may be cancelled when a MAC PDU is transmitted, and this MAC PDU includes an LBT failure MAC CE (plus its subheader) which contains LBT information of all the BWP(s) and/or serving cell(s) that triggered the LBT failure MAC CE (s) prior to the MAC PDU assembly. However, it should be understood that other cancellation mechanisms may not be precluded.

Handling of (Re)Transmission on a UL Resource Scheduled by a Multi-TTI UL Grant

A UE may perform LBT before an UL transmission on a PUSCH resource scheduled by a multi-TTI UL grant as described above. Subsequently, if the UE detects an LBT failure for the UL transmission (e.g., the power detected by the UE, which intends to perform the UL transmission, is higher than a predetermined/configured power threshold) and/or the MAC layer of the UE receives an LBT failure indication from the PHY layer of the UE before the start of the PUSCH resource (in the time domain), and a TB for the corresponding PUSCH resource has been generated, the UE may not transmit the generated TB on the corresponding PUSCH resource. Based on the agreement from the 3GPP RAN WG2, the generated TB for the corresponding PUSCH resource may then be transmitted on another PUSCH resource with a different HARQ process ID. For example, the UE may move or copy the generated TB from a HARQ buffer to another HARQ buffer with the different HARQ process ID. However, additional conditions may be specified, considering the processing complexity internally at the UE.

In one implementation, if a UE fails to perform transmission of a TB, namely TB1, on an UL resource (associated with a HARQ process ID) scheduled by a UL grant (e.g., multi-TTI UL grant)) (e.g., UL resource 1) due to detection of an LBT failure, the UE may perform (re)transmission of TB1 on another UL resource with a different HARQ process ID (e.g., UL resource 2), if one or more or any combination of the following conditions are satisfied.

UL resource 2 and UL resource 1 are both scheduled by the same multi-TTI UL grant.

The grant size of UL resource 2 is equal to or larger than the size (e.g., TBS) of UL resource 1.

UL resource 2 is used for new transmission (e.g., the NDI corresponding to the HARQ process of UL resource 2 has been toggled when comparing with the NDI value in the previous transmission of this HARQ process).

Specifically, the NDI value corresponding to the HARQ process of UL resource 2 may be indicated in the DCI field of (multi-TTI) UL grant that schedules UL resource 2.

UL resource 2 and UL resource 1 are both scheduled by the same RNTI (e.g., MCS-C-RNTI). UL resource 2 and UL resource 1 are both scheduled by a same DCI format.

UL resource 2 is scheduled to transmit on same BWP and/or serving cell as UL resource 1.

UL resource 2 is scheduled to transmit on different BWP and/or serving cell as UL resource 1.

The grant size of UL resource 2 is less than the size of UL resource 1.

The HARQ buffer corresponds to the HARQ process of UL resource 1 does not contain a TB.

The HARQ buffer corresponds to the HARQ process of UL resource 2 does not contain a TB.

The TB in the HARQ buffer corresponds to the HARQ process of UL resource 2 has been transmitted successfully;

A TB (other than TB1) that was intended for the transmission on UL resource 2 has not yet been generated.

A TB (other than TB1) that was intended for the transmission on UL resource 2 does not contain a specific MAC subPDU.

Specifically, a specific MAC subPDU may be referred to as a MAC subPDU with a specific MAC SDU.

Furthermore, a specific MAC SDU may consist data from a specific LCH.

Furthermore, a specific LCH may have a specific priority value as described in Citation 3.

Furthermore, a specific LCH may have a specific mapping restriction(s), e.g., one or more or any combination of allowedSCS-List, maxPUSCH-Duration, configuredGrantType1Allowed, and allowedServing-Cells as described in Citation 3.

Furthermore, a specific LCH may be a DCCH or a CCCH.

Specifically, a specific MAC subPDU may be referred to as a MAC subPDU with a specific MAC CE.

Furthermore, a specific MAC CE may be (but is not limited to be) a Configured Grant Confirmation MAC CE, SCell BFR MAC CE, MAC CE for BSR except for BSR included for padding, PHR MAC CE, MAC CE for Recommended bit rate query, MAC CE for BSR included for padding, etc.

UL resource 2 is the first (or the next) resource that occurs after UL resource 1.

UL resource 2 and UL resource 1 has the same redundancy version.

UL resource 2 is a first PUSCH resource for which LBT is successful after UL resource 1.

UL resource 2 is not used for multiplexing of aperiodic CSI reports.

If UL resource 2 is the first (or the next) configured uplink grant resource that occur after a specific interval upon LBT failure corresponding to the UL resource 1.

UL resource 1 is used for new transmission (e.g., the NDI corresponding to the HARQ process of UL resource 1 has been toggled when comparing with the NDI value in the previous transmission of this HARQ process). Specifically, the NDI value corresponding to the HARQ process of UL resource 1 may be indicated in the DCI field of (multi-TTI) UL grant that schedules UL resource 1.

UL resource 2 is used for retransmission (e.g., the NDI corresponding to the HARQ process of UL resource 2 has not been toggled when comparing with the NDI value in the previous transmission of this HARQ process).

Specifically, the NDI value corresponding to the HARQ process of UL resource 2 may be indicated in the DCI field of (multi-TTI) UL grant that schedules UL resource 2.

An UL grant for retransmission of the TB1 is not received by the UE before UL resource 2 and after UL resource 1.

The TB to be transmitted on UL resource 1 contains a specific MAC subPDU.

Specifically, a specific MAC subPDU may be referred to as a MAC subPDU with a specific MAC SDU.

Furthermore, a specific MAC SDU may consist data from a specific LCH.

Furthermore, a specific LCH may have a specific priority value as described in Citation 3.

Furthermore, a specific LCH may have a priority value which is equal or higher/lower than a specific threshold which may be preconfigured by the gNB.

Furthermore, a specific LCH may have a specific mapping restriction(s), e.g., one or more or any combination of allowedSCS-List, maxPUSCH-Duration, configuredGrantType1Allowed, and allowedServingCells as described in Citation 3.

Furthermore, a specific LCH may be a DCCH or a CCCH.

Specifically, a specific MAC subPDU may be referred to as a MAC subPDU with a specific MAC CE.

Furthermore, a specific MAC CE may be (but is not limited to be) a Configured Grant Confirmation MAC CE, SCell BFR MAC CE, MAC CE for BSR except for BSR included for padding, PHR MAC CE, MAC CE for Recommended bit rate query, MAC CE for BSR included for padding, etc.

(the starting symbol/the ending symbol of) UL resource 2 occurs at least a specific period after (the starting symbol/the ending symbol of) UL resource 1.

More specifically, the specific period may be configured by the network or preconfigured by the UE.

More specifically, the specific period may consider the timeline requirements which essentially require a minimum duration between DCI scheduling a PUSCH and the PUSCH transmission. This value may be derived by the formula provided in TS 38.214 as described in Citation 4, which considers the UE processing capability (e.g., UE processing capability 1 or UE processing capability 2).

The UE is configured, by the network, a specific information element (IE), which indicates that the UE is allowed to perform the (re)transmission of the TB1 on another UL resource associated with different HARQ process ID (that is also scheduled by the same multi-TTI UL grant that schedules UL resource 1).

More specifically, the Serving Cell group/serving cell/UL BWP associated with the PUSCHs granted by the multi-TTI UL grant may be configured, by the network, a specific information element (IE), which indicates whether the UE is allowed to perform the (re)transmission of the TB1 on another UL resource associated with a different HARQ process ID (that is also scheduled by the same multi-TTI UL grant that schedules UL resource 1);

More specifically, the UE may be indicated, by the network, via the Time domain resource assignment field within the DCI of the multi-TTI UL grant. For example, the network indicates a specific SLIV value which associates with a specific row of the PUSCH TDRA table, wherein the specific row was pre-defined with whether the corresponding PUSCH transmission allow (re)transmission TB via different HARQ process.

Otherwise, the UE may not perform (re)transmission of TB1 on another UL resource with a different HARQ process ID. Furthermore, if the UE decides to perform (re)transmission of TB1 on another UL resource with a different HARQ process ID, the UE may flush the HARQ buffer of the HARQ process corresponding the TB1.

In one implementation, if a UE fails to perform transmission a TB (e.g, TB1) on a UL resource (e.g., UL resource 1) scheduled by a multi-TTI UL grant (due to LBT failure), the UE may perform (re)transmission of TB1 on another UL resource (e.g., UL resource 2) with a different HARQ process ID, if UL resource 1 and UL resource 2 have the same grant size and are both scheduled by the same multi-TTI UL grant.

Figure 6:
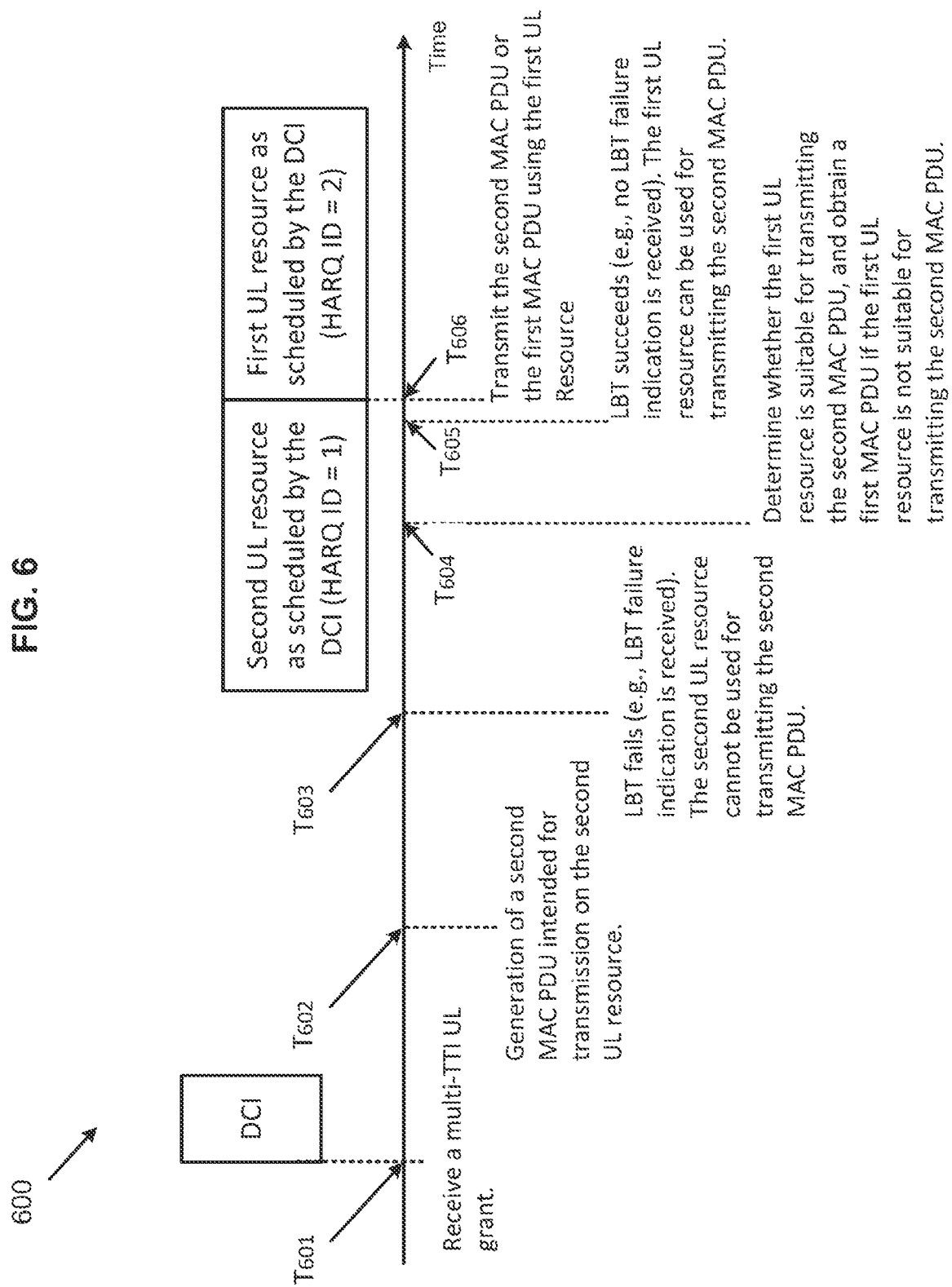
FIG. 6 illustrates a diagram for handling (re)transmission on a UL resource scheduled by a multi-TTI UL grant, according to an example implementation of the present disclosure.

FIG. 6 illustrates a diagram for handling (re)transmission on a UL resource scheduled by a multi-TTI UL grant, according to an example implementation of the present disclosure. At time $T_{601}$, the UE may receive a dynamic grant (e.g., a multi-TTI UL grant) for scheduling one or more UL resources. In one implementation, the dynamic grant is received by the UE in DCI. In the present implementation, the dynamic grant may schedule a first UL resource (e.g., a PUSCH resource) having a HARQ ID (e.g., HARQ ID=2) and a second UL resource (e.g., another PUSCH resource) having another HARQ ID (e.g., HARQ ID=1). In the present implementation, the second UL resource and the first UL resource may be consecutive resources in the time domain. As illustrated in FIG. 6, the first UL resource may be immediately after the second UL resource in the time domain.

At time $T_{602}$, the UE may generate a second MAC PDU for transmission on the second UL resource as scheduled by the dynamic grant. The second MAC PDU is stored in a HARQ buffer after being generated, and the HARQ buffer is associated with a HARQ process of the second UL resource. The UE may also start an LBT procedure to determine if the second UL resource is available for transmitting the second MAC PDU.

At time $T_{603}$, the UE may determine that the LBT procedure for the second UL resource has failed. For example, the UE may receive an LBT failure indication indicating that the second UL resource cannot be used for transmitting the second MAC PDU. The UE may subsequently start another LBT procedure to determine if the first UL resource is available for transmission.

At time $T_{604}$, the UE may determine whether the first UL resource is suitable for transmitting the second MAC PDU. The first UL resource is suitable for transmitting the second MAC PDU if at least one of the above-mentioned conditions is satisfied.

Based on whether the first UL resource is suitable for transmitting the second MAC PDU, the UE may determine whether to obtain a first MAC PDU for transmission using the first UL resource or to transmit the already generated second MAC PDU before obtaining the first MAC PDU. For example, if the first UL resource is suitable for transmitting the second MAC PDU, the UE may decide to transmit the already generated second MAC PDU (and has been stored in the HARQ buffer) before obtaining the first MAC PDU. If the first UL resource is not suitable for transmitting the second MAC PDU, the UE may obtain a first MAC PDU for transmission using the first UL resource. Moreover, obtaining the first MAC PDU may include generating the first MAC PDU or retrieving the first MAC PDU. In one example, after determining the first UL resource is not suitable for transmitting the second MAC PDU, the UE may generate a new MAC PDU (e.g., the first MAC PDU) if the first UL resource is indicated for a new transmission (e.g., the NDI corresponding to the HARQ process of the first UL resource has been toggled when comparing with the NDI value in the previous transmission of this HARQ process). In another example, after determining the first UL resource is not suitable for transmitting the second MAC PDU, the UE may retrieve a MAC PDU (e.g., the first MAC PDU) that is already generated and stored in the HARQ buffer associated with the HARQ process of the first UL resource if the first UL resource is indicated for a retransmission (e.g., the NDI corresponding to the HARQ process of the first UL resource has not been toggled when comparing with the NDI value in the previous transmission of this HARQ process).

At time $T_{605}$, the UE may determine that the LBT for the first UL resource has succeeded. For example, the UE does not receive an LBT failure indication. Thus, the first UL resource is available, and can be used for transmission.

At time $T_{606}$, the UE may transmit the second MAC PDU using the first UL resource when the first UL resource is suitable for transmitting the second MAC PDU. For example, the UE may obtain the second MAC PDU from the HARQ buffer associated with the HARQ process of the second UL resource, and transmit the second MAC PDU using the first UL resource. Alternatively, when it is determined that the first UL resource is not suitable for transmitting the second MAC PDU, the UE may transmit the first MAC PDU using the first UL resource. In the present example, the first UL resource may be considered suitable for transmitting the second MAC PDU if the second UL resource and the first UL resource are each intended for a new transmission, and the size (e.g., TBS) of the first UL resource is equal to the size (e.g., TBS) of the second UL resource. In contrast, the first UL resource may be considered not suitable for transmitting the second MAC PDU if the second UL resource and the first UL resource are not both intended for a new transmission (e.g., the second UL resource is intended for new transmission and first UL resource is intended for retransmission or vice versa) or if the size (e.g., TBS) of the first UL resource is not equal to the size (e.g., TBS) of the second UL resource.

Figure 7:
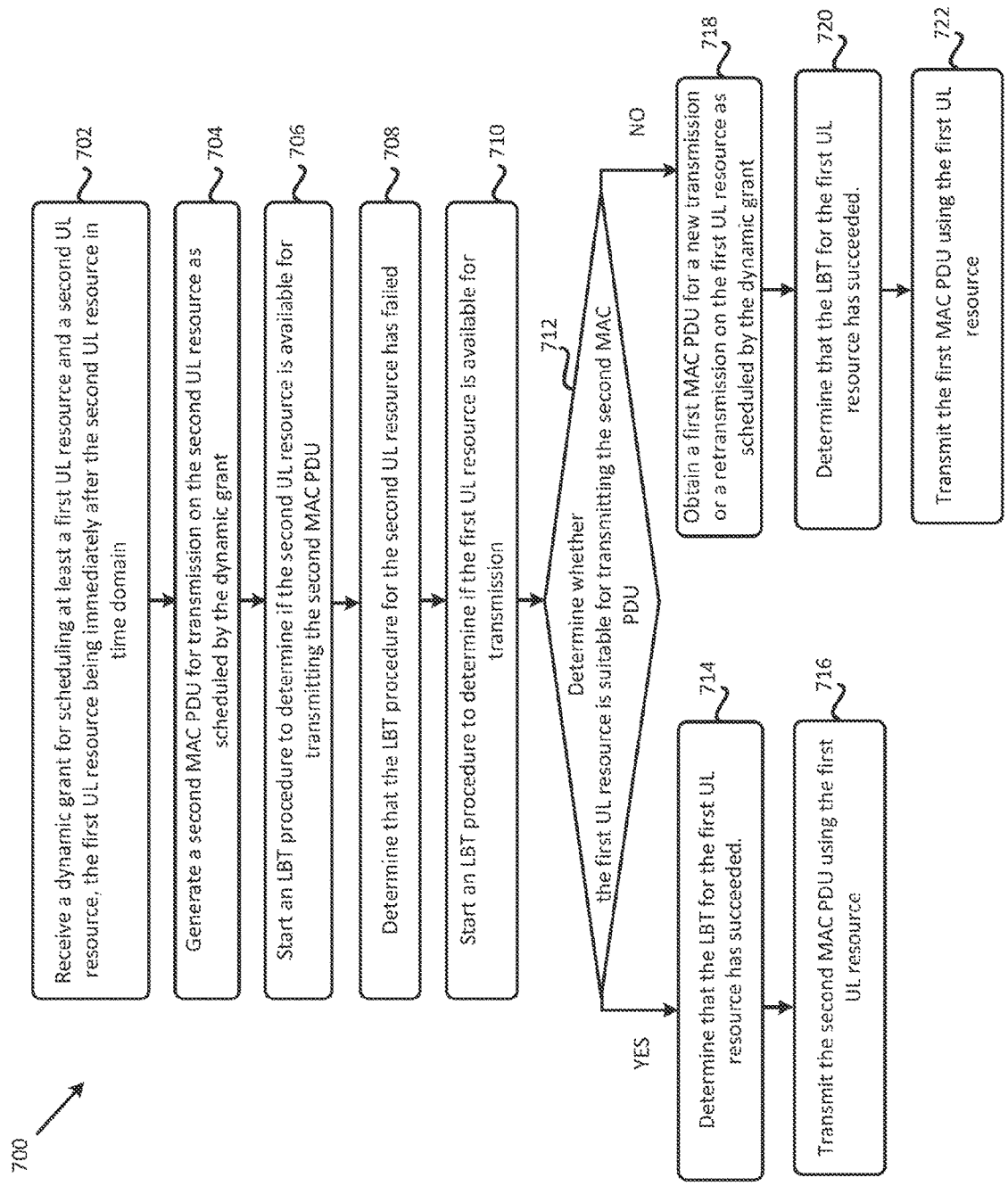
FIG. 7 illustrates a flowchart of a method by a UE for handling (re)transmission on a UL resource scheduled by a multi-TTI UL grant, according to an example implementation of the present disclosure.

FIG. 7 illustrates a flowchart 700 of a method by a UE for handling (re)transmission on a UL resource scheduled by a multi-TTI UL grant, according to an example implementation of the present disclosure.

In action 702, the UE may receive a dynamic grant (e.g., a multi-TTI UL grant) for scheduling one or more UL resources. In one implementation, the dynamic grant is received by the UE in a DCI. With reference to FIG. 6, the dynamic grant may schedule a first UL resource (e.g., a PUSCH resource) having a HARQ ID (e.g., HARQ ID=2) and a second UL resource (e.g., another PUSCH resource) having another HARQ ID (e.g., HARQ ID=1). The second UL resource and the first UL resource may be consecutive resources in the time domain, where the first UL resource may be immediately after the second UL resource. In the present implementation, at least one of the second UL resource and the first UL resource may be intended for a new transmission. For example, each of the second UL resource and the first UL resource is intended for a new transmission. In another example, the second MAC PDU is for a new transmission and the first MAC PDU is for retransmission, or vice versa. In one implementation, the size of the first UL resource may be equal to or greater than the size of the second UL resource.

In action 704, the UE may generate a second MAC PDU for transmission on the second UL resource as scheduled by the dynamic grant. The second MAC PDU is stored in a HARQ buffer after being generated, and the HARQ buffer is associated with a HARQ process of the second UL resource.

In action 706, the UE may start an LBT procedure to determine whether the second UL resource is available for transmitting the second MAC PDU.

In action 708, the UE may determine that the LBT procedure for the second UL resource has failed. For example, the UE may receive an LBT failure indication (e.g., the MAC layer of the UE may receive an LBT failure indication from the PHY layer of the UE) indicating that the second UL resource cannot be used for transmitting the second MAC PDU. Consequently, the UE may start an LBT procedure to see if the first UL resource is available for transmission.

In action 710, the UE may start another LBT procedure to determine whether the first UL resource is available for transmission.

In action 712, the UE may determine whether the first UL resource is suitable for transmitting the second MAC PDU. For example, based on whether the first UL resource is suitable for transmitting the second MAC PDU, the UE may determine whether to obtain a first MAC PDU for transmission using the first UL resource, or to transmit the already generated second MAC PDU before obtaining the first MAC PDU.

In one implementation, the first UL resource is suitable for transmitting the second MAC PDU if at least one of the following conditions is satisfied:
the second MAC PDU is generated for transmission using a second UL resource scheduled by the dynamic grant;
the second UL resource is indicated for another new transmission;
the second UL resource is before the first UL resource in a time domain;
the size of the first UL resource is equal to or greater than the size of the second UL resource;
the second MAC PDU is not transmitted successfully on the second UL resource due to a UL LBT failure; and
the second UL resource associated with the second HARQ ID is different from the first HARQ ID associated with the first UL resource.

If the UE determines that the first UL resource is suitable for transmitting the second MAC PDU, the flowchart 700 proceeds from action 712 to action 714. In action 714, the UE may determine that the LBT for the first UL resource has succeeded. For example, the UE does not receive an LBT failure indication. Thus, the first UL resource is available, and can be used for transmission of the second MAC PDU. In action 716, the UE may transmit the second MAC PDU using the first UL resource. For example, the UE may obtain the second MAC PDU from the HARQ buffer, and transmit the second MAC PDU using the first UL resource.

If the UE determines that the first UL resource is not suitable for transmitting the second MAC PDU, the flowchart 700 proceeds from action 712 to action 718. In action 718, the UE may obtain a first MAC PDU for transmission on the first UL resource as scheduled by the dynamic grant. Moreover, obtaining the first MAC PDU may include generating a new MAC PDU or retrieving a stored (e.g., previously generated) MAC PDU from a HARQ buffer. In one example, after determining the first UL resource is not suitable for transmitting the second MAC PDU, the UE may generate the first MAC PDU (e.g., a new MAC PDU) if the first UL resource is indicated for a new transmission (e.g., the NDI corresponding to the HARQ process of the first UL resource has been toggled when comparing with the NDI value in the previous transmission of this HARQ process). In another example, after determining the first UL resource is not suitable for transmitting the second MAC PDU, the UE may retrieve the first MAC PDU that is already generated and stored in the HARQ buffer associated with the HARQ process of the first UL resource if the first UL resource is indicated for retransmission (e.g., the NDI corresponding to the HARQ process of the first UL resource has not been toggled when comparing with the NDI value in the previous transmission of this HARQ process). In action 720, the UE may determine that the LBT for the first UL resource has succeeded. For example, the UE does not receive an LBT failure indication. Thus, the first UL resource is available, and can be used for transmission of the first MAC PDU. In action 722, the UE may transmit the first MAC PDU using the first UL resource. In the present example, the UE may determine that the first UL resource is suitable for transmitting the second MAC PDU because all the conditions:

the second MAC PDU is generated for transmission using a second UL resource scheduled by the dynamic grant;
the second UL resource is indicated for another new transmission;
the second UL resource is before the first UL resource in a time domain;
the size of the first UL resource is equal to the size of the second UL resource;
the second MAC PDU is not transmitted successfully on the second UL resource due to a UL LBT failure; and
the second UL resource associated with the second HARQ ID is different from the first HARQ ID associated with the first UL resource, are satisfied.

In one implementation, if a UE fails to perform transmission a TB (e.g., TB1) on a UL resource (e.g., UL resource 1) scheduled by a multi-TTI UL grant (due to LBT failure), the UE may perform (re)transmission of TB1 on another UL resource (e.g., UL resource 2) with a different HARQ process ID, if TB1 contains a specific MAC subPDU with at least one MAC SDU consisting data from a DCCH. The reason is that the DCCH may be mapped to signaling radio bearers (e.g., SRB1 and SRB2). Hence, the data from the DCCH may be more important and requires special handling.

In one implementation, if a UE fails to perform transmission a TB (e.g., TB1) on a UL resource (e.g., UL resource 1) scheduled by a multi-TTI UL grant (due to LBT failure), the UE may perform (re)transmission of TB1 on another UL resource (e.g., UL resource 2) with a different HARQ process ID, if UL resource 1 and UL resource 2 are both scheduled by the same multi-TTI UL grant and UL resource 2 is used for a new transmission (e.g., the NDI corresponding to the HARQ process of UL resource 2 has been toggled when comparing with the NDI value in the previous transmission of this HARQ process). Moreover, another TB (different from TB1) for UL resource 2 has not yet been generated. In this implementation, the UE may also flush the HARQ buffer corresponding to the HARQ process of UL resource 1.

In one implementation, if a UE fails to perform transmission a TB (e.g., TB1) on a UL resource (e.g., UL resource 1) scheduled by a multi-TTI UL grant (due to LBT failure), the UE may perform (re)transmission of TB1 on another UL resource (e.g., UL resource 2) with a different HARQ process ID. However, if the grant size of the UL resource 2 does not match with size of the TB1, the UE may indicate to the multiplexing and assembly entity to include MAC subPDU(s) carrying MAC SDU from TB1 in the subsequent UL transmission (s) (e.g., transmission on UL resource 2), and obtain the MAC PDU to transmit on UL resource 2 from the multiplexing and assembly entity.

In one implementation, if a UE fails to perform transmission a TB (e.g., TB1) on a UL resource (e.g., UL resource 1) scheduled by a multi-TTI UL grant (due to LBT failure), the UE may perform (re)transmission of TB1 on another UL resource (e.g., UL resource 2) with a different HARQ process ID, if UL resource 1 and UL resource 2 are both scheduled by the same multi-TTI UL grant and UL resource 1 and UL resource 2 are each used for a new transmission (e.g., the NDI corresponding to the HARQ processes of UL resource 1 and UL resource 2 have been toggled when comparing with the NDI value in the previous transmission of these HARQ processes). Moreover, the UE generates TB2 for the HARQ process corresponding to UL resource 1 and stores TB2 in the HARQ buffer corresponding to UL resource 1.

Avoid Transmission Gaps within PUSCHs Scheduled by a Multi-TTI UL Grant Due to skipUplinkTxDynamic In NR, a PUSCH scheduled by a dynamic grant can be skipped if the MAC entity of a UE is configured with skipUplinkTxDynamic and the conditions listed below are satisfied as described in Citation 5:

The grant indicated to the HARQ entity was addressed to a C-RNTI.
There is no aperiodic CSI requested for this PUSCH transmission as specified in TS 38.212.
the MAC PDU includes zero MAC SDUs.
the MAC PDU includes only the periodic BSR and there is no data available for any LCH, or the MAC PDU includes only the padding BSR.

Hence, if skipUplinkTxDynamic is configured with value true for a MAC entity, a PUSCH scheduled by a multi-TTI UL grant may be skipped by a UE if the above-mentioned conditions are satisfied. However, in some implementations, a transmission gap could potentially be introduced between PUSCH resources scheduled by a multi-TTI UL grant.

Figure 8:
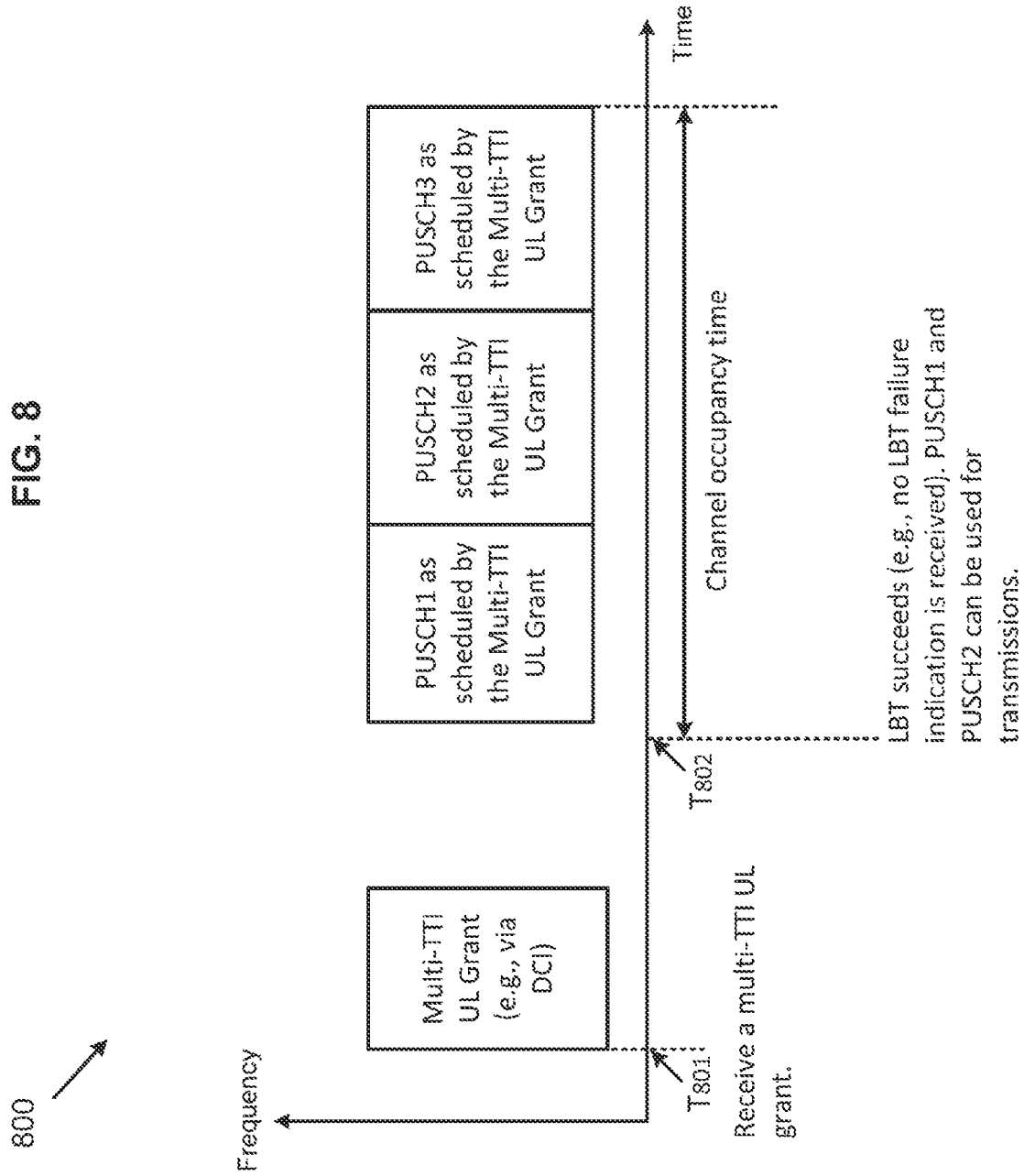
FIG. 8 illustrates a multi-TTI UL grant that schedules multiple PUSCH resources, in accordance with an example implementation of the present disclosure.

FIG. 8 illustrates a multi-TTI UL grant that schedules multiple PUSCH resources, in accordance with an example implementation of the present disclosure. At time $T_{801}$, the UE may receive a dynamic grant (e.g., a multi-TTI UL grant) for scheduling one or more UL resources. In one implementation, the dynamic grant is received by the UE in DCI. In the present implementation, the dynamic grant may schedule a first UL resource (e.g., PUSCH 1), a second UL resource (e.g., PUSCH 2), and a third UL resource (e.g., PUSCH 3). In the present implementation, PUSCH 1, PUSCH 2, and PUSCH 3 are consecutive resources in the time domain. At time $T_{802}$, the UE may determine that the LBT procedure has succeeded. For example, the UE does not receive an LBT failure indication. Thus, PUSCH 1 and PUSCH 2 are available, and can be used for transmission.

If the UE decided to skip the transmission of PUSCH 2 (e.g., the UE does not generate a TB for transmission on PUSCH 2), it would be required to perform LBT for subsequent PUSCH(s) scheduled by the same multi-TTI UL grant (e.g., PUSCH 3) even though LBT has already been successful on the earlier scheduled PUSCH(s) (e.g., PUSCH 1). In the present implementation, the UE may ignore the configuration of skipUplinkTxDynamic and generate a MAC PDU (e.g., a filler PDU) for transmission PUSCH 2, so that the UE does not have to perform LBT before transmission using PUSCH 3. In the present implementation, the UE may conditionally disable skipping of PUSCH scheduled by a multi-TTI UL grant even when skipUplinkTxDynamic is configured with value true. As such, the UE may avoid the transmission gap(s) within PUSCHs scheduled by the multi-TTI UL grant due to the skipUplinkTxDynamic.

In another implementation, the UE may transmit a PUSCH, namely PUSCH 1, scheduled by a dynamic grant (e.g., dynamic grant 1) addressed to C-RNTI. Despite all conditions in category A has been satisfied, the UE may still transmit on PUSCH 1 (e.g., The MAC entity may still generate a MAC PDU for the HARQ process corresponding to PUSCH 1) if one or more or any combination of the conditions in category B are satisfied. Alternatively, the UE may ignore the configuration of skipUplinkTxDynamic if one or more or any combination of the conditions in category B are satisfied. Alternatively, the UE may consider the configuration of skipUplinkTxDynamic as false if one or more or any combination of the conditions in category B are satisfied.

Conditions in Category A:
skipUplinkTxDynamic is configured for the UE (e.g., configured for the MAC entity of the UE).
There is no aperiodic CSI requested for PUSCH 1 transmission as specified in TS 38.212 as described in Citation 6.
the MAC PDU includes zero MAC SDUs.
the MAC PDU includes only the periodic BSR and there is no data available for any LCH, or the MAC PDU includes only the padding BSR.

Conditions in Category B:
The UL resource(s) is scheduled on an un-licensed spectrum.
Dynamic grant 1 is a multi-TTI UL grant.
More specifically, dynamic grant 1 may allocate more than one PUSCH resources, whereas PUSCH 1 is one of the multiple PUSCH resources allocated by dynamic grant 1.
More specifically, PUSCH 1 is not the last PUSCH resources allocated by dynamic grant 1.
Dynamic grant 1 is a multi-TTI UL grant and PUSCH 1 is not the earliest or latest PUSCH (in the time domain) out of all the PUSCHs scheduled by dynamic grant 1.
More specifically, dynamic grant 1 may allocate multiple PUSCH resources that are contiguous in the time domain.
Dynamic grant 1 is a multi-TTI UL grant and PUSCH 1 is the PUSCH for multiplexing aperiodic CSI report or is the PUSCH before the PUSCH for multiplexing aperiodic CSI report.
More specifically, dynamic grant 1 may allocate multiple PUSCH resources that are contiguous in the time domain.
Dynamic grant 1 is a multi-TTI UL grant and PUSCH 1 is a PUSCH overlapping with a PUCCH for transmission of HARQ-ACK or CSI report.
More specifically, dynamic grant 1 may allocate multiple PUSCH resources that are contiguous in the time domain.
The time duration of PUSCH 1 is longer than a specific value.
More specifically, the specific value may be configured by the network or preconfigured by the UE.
More specifically, the specific value may be the maximum time gap between UL transmissions that belong to the same UL burst, e.g., 16 microseconds as described in Citation 1.
Dynamic grant 1 is a multi-TTI UL grant and the transmission has been successfully performed for PUSCH(s) that are scheduled by dynamic grant 1 and occur earlier than PUSCH 1.
In one case, if the PUSCH(s) that are also scheduled by dynamic grant 1 and occur earlier than PUSCH 1 in the time domain was successfully transmitted, the UE may not need to perform LBT before PUSCH 1 transmission because PUSCH 1 may be still within the COT obtained by the UE. In this case, the UE may still perform transmission in PUSCH 1 if all the conditions in category A are satisfied. As such, a transmission gap may be avoided.
In one case, if the PUSCH(s) that are also scheduled by dynamic grant 1 and occur earlier than PUSCH 1 in the time domain was not successfully transmitted, the UE may need to perform LBT before PUSCH 1 transmission. In this case, the UE may skip the transmission PUSCH 1 if all the conditions are satisfied in category A.

In one aspect of the present implementation, what could be transmitted on PUSCH 1 may be (but is not limited to) one or multiple of the following contents:
A MAC subPDU including a short BSR MAC CE (and its corresponding MAC subheader).
A MAC subPDU including a BFR MAC CE (and its corresponding MAC subheader).
A MAC subPDU including padding (and its corresponding MAC subheader).
A MAC subPDU with a MAC subheader only.

In one implementation, the network may indicate (via RRC signaling, DCI, MAC CE, etc.) whether a UE should perform transmission on all the received PUSCH resources scheduled by a dynamic grant (and is a multi-TTI UL grant). Such a configuration may be configured per BWP/Cell/subset of CG. The UE may not skip the transmission on any received PUSCH resource scheduled by a dynamic grant (and is a multi-TTI UL grant) on the indicated BWP/Cell/subset of CG even if all the conditions in category A has been satisfied.

In one implementation, the network may indicate (via RRC signaling, DCI, MAC CE, etc.) whether a UE should perform transmission on all the received PUSCH resources that corresponds to a configured UL grant configuration. Such a configuration may be configured per BWP/Cell/subset of CG. The UE may not skip the transmission on any received PUSCH resource that corresponds to a configured UL grant configuration on indicated BWP/Cell/subset of CG.

In one implementation, the network may not configure skipUplinkTxDynamic for a UE or may need to configure skipUplinkTxDynamic with value false for a UE, if the UE is configured with multi-TTI UL grant.

Specifically, the UE may be considered as being configured with multi-TTI UL grant if it is configured, by the network (via RRC signaling), a TDRA list (e.g., puschTimeDomainAllocationList-r16 IE) with at least one row that includes the time-domain relationship between one PDCCH and multiple PUSCH resource allocations (e.g., a row that includes more than one startSymbolAndLength values).

In one implementation, the network may not configure skipUplinkTxDynamic for a UE or may need to configure skipUplinkTxDynamic with value false for a UE, if the UE is configured with NR-U functionality.

In one implementation, even if a UE is configured skipUplinkTxDynamic and with a value of true, the UE may not generate a MAC PDU upon reception dynamic grant if conditions in category A are satisfied and the PUSCH scheduled by the dynamic grant is in a licensed serving cell. Specifically, the UE may be considered as being configured with NR-U functionality by the presence of specific NR-U related configurations. For example, by the presence of NRU-UplinkLbtFailureConfig-r16 IE, RMTC-Config-r16 IE, additionalMonitoringOccasionOfPO-r16 IE, etc. More specifically, the UE may be considered as being configured with NR-U functionality if it has indicated the network that it is capable of supporting NR-U functionality. Such a capability information may be conveyed via UE capability RRC signaling (e.g., UE-NR-Capability IE).

Suspension of UL Transmission Upon BWP Switching Due to Consistent UL LBT Failures on a SpCell Upon consistent UL LBT failures on an UL BWP of a SpCell (e.g., LBT_COUNTER reaches lbt-FailureInstanceMaxCount for the corresponding UL BWP of the SpCell), a UE may trigger consistent UL LBT failure for the corresponding UL BWP. Subsequently, if not all the UL BWP(s) configured with PRACH occasions (e.g., PRACH resource) of the SpCell has been triggered with consistent UL LBT failure, the UE may switch to a new UL BWP configured with PRACH occasion (e.g., PRACH resource), and for which consistent UL LBT failure has not been triggered (as shown in FIGS. 3 and 4). Thereafter, the UE may initiate an RA procedure on the new UL BWP. In this case, it may not be desirable for the UE to directly perform a specific UL transmission on the new UL BWP. Here, a specific UL transmission may be referred to as (but is not limited to be) type 1 configured grant transmission on PUSCH, periodic CSI reporting on PUCCH, semi-persistent CSI reporting on PUCCH, periodic SRS transmission on PUCCH. One reason is that the network is not aware of the UE-initiated UL BWP switching due to consistent UL LBT failures on the SpCell. Another reason is that the channel condition of the new UL BWP may be uncertain before the RA procedure on the new UL BWP is successfully completed (e.g., before the SpCell LBT recovery procedure is successfully completed). Allowing direct UL transmission attempt on the new UL BWP may not be a proper UE behavior, at a risk of UL LBT failure and unsuccessful UL transmission. Therefore, certain mechanisms may be introduced to conditionally allow the resumption of UL transmission upon activation of an inactive BWP (due to BWP switching).

In one implementation, consistent UL LBT failures may occur on an old UL BWP of a SpCell (e.g., LBT_COUNTER reaches lbt-FailureInstanceMaxCount for the corresponding UL BWP of the SpCell) of a UE, which results in UE-initiated BWP switch to a new UL BWP configured with PRACH occasion (e.g., PRACH resource) and for which consistent UL LBT failure has not been triggered. Subsequently, the UE may perform update process(es) upon switching to the new UL BWP. The update process(es) may be one or more or any combination of the following:

Postpone specific UL transmission(s) on the new UL BWP.
More specifically, a specific UL transmission may be an SRS transmission, transmission of aperiodic/semi-static CSI report or other UCIs (e.g., SR or HARQ feedback) on PUCCH resource, transmission on PUSCH resources that corresponds to a configured grant Type 1 configuration, etc.
More specifically, the UE may postpone the specific UL transmission(s) on the new UL BWP until the RA procedure (triggered due to consistent UL LBT failures) on the new UL BWP is successfully completed.
Postpone (re-)initialization of any suspended configuration(s) on the new UL BWP.
In one implementation, a suspended configuration may be a configuration of configured grant Type 1, a configuration of periodic SRS, a configuration of semi-static SRS, a configuration of periodic CSI reporting (on PUCCH resource), a configuration of semi-static CSI reporting (on PUCCH resource). Those configurations may be configured, by the network, via RRC signaling.

A further update process(es) may be one or more or any combination of the following:

The UE may postpone the specific UL transmission(s) on the new UL BWP until one or more or any combination of the conditions in category C has been satisfied.
More specifically, a specific UL transmission may be an SRS transmission, transmission of aperiodic/semi-static CSI report or other UCIs (e.g., SR or HARQ feedback) on PUCCH resource, transmission on PUSCH resources that corresponds to a configured grant Type 1 configuration, etc.
(re-)initialization of any suspended configuration(s) on the new UL BWP when one or more or any combination of the conditions in category C has been satisfied.
In one implementation, a suspended configuration may be a configuration of configured grant Type 1, a configuration of periodic SRS, a configuration of semi-static SRS, a configuration of periodic CSI reporting (on PUCCH resource), a configuration of semi-static CSI reporting (on PUCCH resource). Those configurations may be configured, by the network, via RRC signaling.

Conditions in Category C:

Upon successful completion of an RA procedure (that is initiated as part of the SpCell LBT recovery procedure) on the new UL BWP.
In one example, consistent UL LBT failures may occur on an old UL BWP of a SpCell (e.g., LBT_COUNTER reaches lbt-FailureInstanceMaxCount for the corresponding UL BWP of the SpCell) of a UE, which results in UE-initiated BWP switch to a new UL BWP configured with PRACH occasion (e.g., PRACH resource) and for which consistent UL LBT failures has not been triggered. Subsequently, the UE may (re-)initialize a suspended configuration (e.g., configured grant Type 1, periodic SRS configuration, periodic CSI reporting, etc.) on the new UL BWP after the RA procedure has been successfully completed on the new UL BWP.
Upon successful completion of an LBT recovery procedure of the SpCell.
In one example, consistent UL LBT failures may occur on an old UL BWP of a SpCell (e.g., LBT_COUNTER reaches lbt-FailureInstanceMaxCount for the corresponding UL BWP of the SpCell) of a UE, then the UE may initiate an LBT recovery procedure for the SpCell.
Upon transmission of an LBT failure MAC CE (as part of the SpCell LBT recovery procedure).
Specifically, the LBT failure MAC CE may be transmitted after the UE switches to the new UL BWP.
Specifically, the LBT failure MAC CE may identify the BWP(s) and/or cells where consistent UL LBT failure(s) has been detected.

Specifically, the LBT failure MAC CE may be transmitted via an UL resource allocated on a different serving from the serving cell where the SpCell LBT recovery procedure has been initiated or be transmitted via any available UL resource without restriction.

Specifically, the LBT failure MAC CE may include the LBT information (e.g., BWP ID and/or cell ID) of all (or part of) the BWP(s) (or serving cell(s)) that triggered LBT failure MAC CE(s) prior to the MAC PDU assembly carrying the LBT failure MAC CE (plus its subheader).

If the UE instructs the Multiplexing and Assembly procedure to generate the LBT failure MAC CE, the UE may perform the Multiplexing and assembly procedure (including Logical Channel prioritization procedure) as described in Citation 5. During the multiplexing and assembly procedure, the UE may multiplex the generated MAC CE(s) and/or MAC SDU(s) in a MAC PDU. Then the UE may transmit the MAC PDU (e.g., via a UL-SCH resource). More specifically, MAC PDU assembly can happen at any point in time between uplink grant reception and actual transmission of the corresponding MAC PDU.

In one example, consistent UL LBT failures may occur on an old UL BWP of a SpCell (e.g., LBT_COUNTER reaches lbt-FailureInstanceMaxCount for the corresponding UL BWP of the SpCell) of a UE, which results in UE-initiated BWP switch to a new UL BWP configured with PRACH occasion (e.g., PRACH resource) and for which consistent UL LBT failures has not been triggered. Subsequently, the UE may (re-)initialize a suspended configuration (e.g., configured grant Type 1, periodic SRS configuration, periodic CSI reporting, etc.) on the new UL BWP after an LBT failure MAC CE has been successfully transmitted. (Moreover, this LBT failure MAC CE includes LBT information (e.g., BWP ID and/or cell ID) of all the serving cell(s) that triggered LBT failure MAC CE(s) prior to the MAC PDU assembly carrying the LBT failure MAC CE).

Upon determination of a positive response from the network corresponding to the transmitted LBT failure MAC CE.

Specifically, a positive response may be explicitly indicated from the network or implicitly determined by the UE itself. If a positive response is determined/received by the UE, it implies the network has successfully received the LBT failure MAC CE, which was transmitted by the UE as part of the SpCell LBT recovery procedure.

In one implementation, a positive response may be an explicit DL HARQ feedback from the network (e.g., an explicit DL HARQ-ACK), which indicates the HARQ process of an UL transmission that includes an LBT failure MAC CE has been successfully received.

In one implementation, a positive response may be implicitly determined by a UE upon reception of an (dynamic) UL grant for new transmission (e.g., with toggled NDI), whereas the (dynamic) UL grant corresponds to the same HARQ process ID as the UL resource where an LBT failure MAC CE was transmitted.

In one implementation, a positive response may be implicitly determined by a UE upon a specific timer expires. For example, the specific timer may be (re-)started upon the transmission of the LBT failure MAC CE.

In one implementation, if an LBT failure MAC CE was transmitted on a configured UL grant resource (e.g., a PUSCH resource that corresponds to a configured grant configuration), the positive response may be implicitly determined by the UE that transmitted the LBT failure MAC CE. For example, upon expiration of a configuredGrantTimer as described in Citation 5 for the HARQ process of a configured UL grant resource (e.g., a PUSCH resource that corresponds to a configured grant configuration) where the LBT failure MAC CE was transmitted.

Specifically, the configured grant configuration may be (but is not limited to be) a configured grant Type 1/configured grant Type 2 configuration.

In one implementation, if an LBT failure MAC CE was transmitted on a Msg 3 (e.g., transmitted on a PUSCH resource scheduled by an RAR, which corresponds to an RA procedure initiated as part of the SpCell LBT failure recovery procedure), the positive response may be an explicit HARQ-ACK from the network, e.g., a PDCCH address to C-RNTI (that contains an UL grant for new transmission) indicated by the network while the ra-ContentionResolutionTimer as described in Citation 5 is running.

In one example, consistent UL LBT failures may occur on an old UL BWP of a SpCell (e.g., LBT_COUNTER reaches lbt-FailureInstanceMaxCount for the corresponding UL BWP of the SpCell) of a UE, which results in UE-initiated BWP switch to a new UL BWP configured with PRACH occasion (e.g., PRACH resource) and for which consistent UL LBT failures has not been triggered.

Subsequently, the UE may transmit an LBT failure MAC CE (which includes LBT information (e.g., BWP ID and/or cell ID) of all the serving cell(s) that triggered LBT failure MAC CE(s) prior to the MAC PDU assembly carrying the LBT failure MAC CE). Subsequently, the UE may (re-)initialize a suspended configuration (e.g., configured grant Type 1, periodic SRS configuration, periodic CSI reporting, etc.) on the new UL BWP after determine/receiving a positive response (from the network) corresponding to a transmitted LBT failure MAC CE.

In one case, if the MAC CE is transmitted on an UL resource with HARQ process 1, the network may signal a positive response via a PDCCH (addressed to C-RNTI) indicating an UL grant for a new transmission (with toggled NDI) for HARQ process 1.

In one case, if the MAC CE is transmitted on an UL resource with HARQ process 1, and for which corresponds to a configured UL grant configuration, the network may signal a positive response via an explicit DL HARQ feedback (e.g., DFI) with HARQ process 1.

In one case, if the MAC CE is transmitted on an UL resource with HARQ process 1, and for which corresponds to a configured UL grant configuration, the UE may determine a positive response upon expiration of the configuredGrantTimer as described in Citation 5 which corresponds to HARQ process 1. In this case, the configuredGrantTimer is start upon transmission of the MAC CE on the UL resource.

In one case, if the LBT failure MAC CE is transmitted on a Msg 3 (e.g., transmitted on a PUSCH resource scheduled by an RAR, which corresponds to an RA procedure initiated as part of the SpCell LBT failure recovery procedure), the network may signal a positive response via a PDCCH addressed to C-RNTI (that contains an UL grant for new transmission) while the ra-ContentionResolutionTimer as described in Citation 5 is running. In this case, the ra-ContentionResolution-Timer is started in the first symbol after the Msg 3 transmission carrying the MAC CE as described in Citation 5.

The following is an example BWP operation according to an example implementation of the present application.

| Bandwidth Part Operation |
|---|
| In addition to clause 12 of TS 38.213 as described in Citation 7, this subclause specifies requirements on BWP operation.<br>A Serving Cell may be configured with one or multiple BWPs, and the maximum number of BWP per Serving Cell is specified in TS 38.213 as described in Citation 7.<br>The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 as described in Citation 3) is active without receiving PDCCH indicating a downlink assignment or an uplink grant. The active BWP for a Serving Cell is indicated by either RRC or PDCCH (as specified in TS 38.213 as described in Citation 7). For unpaired spectrum, a DL BWP is paired with a UL BWP, and BWP switching is common for both UL and DL.<br>For each activated Serving Cell configured with a BWP, the MAC entity shall:<br>   1> if a BWP is activated:<br>      2>transmit on UL-SCH on the BWP<br>      2>transmit on RACH on the BWP, if PRACH occasions are configured;<br>      2>monitor the PDCCH on the BWP;<br>      2>transmit PUCCH on the BWP, if configured;<br>      2>receive DL-SCH on the BWP;<br>      2>if the BWP is activated after SpCell LBT failure-initiated BWP switching:<br>          3> (re-)initialize any suspended configured uplink grants of configured grant Type 1 on the active BWP according to the stored configuration, if any, and to start in the symbol according to rules in subclause 5.8.2. after the RA procedure initiated as part of SpCell LBT failure has been finished or stopped;<br>          3> report CSI for the BWP after the RA procedure initiated as part of SpCell LBT failure has been finished or stopped;<br>          3> transmit SRS on the BWP, if configured, after the RA procedure initiated as part of SpCell LBT failure has been finished or stopped;<br>      2> else<br>          3> (re-)initialize any suspended configured uplink grants of configured grant Type 1 on the active BWP according to the stored configuration, if any, and to start in the symbol according to rules in subclause 5.8.2<br>          3> report CSI for the BWP<br>          3> transmit SRS on the BWP, if configured. |

Figure 9:
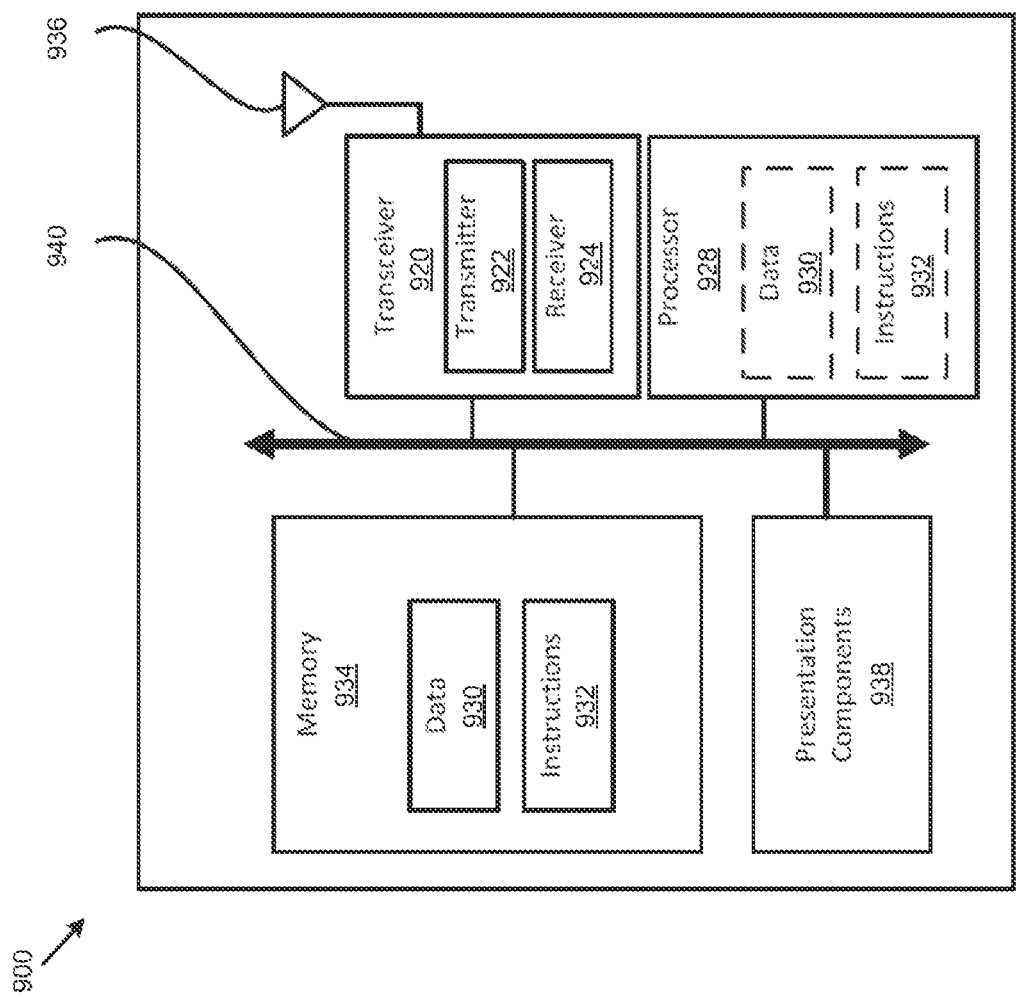
FIG. 9 is a block diagram illustrating a node for wireless communication, according to various aspects of the present disclosure.

FIG. 9 is a block diagram illustrating a node for wireless communication, according to various aspects of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including but not limited to usable, non-usable and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store computer-readable, computer-executable instructions 932 (e.g., software codes) that are configured to cause the processor 928 to perform various functions disclosed herein, for example, with reference to FIGS. 1 through 8. Alternatively, the instructions 932 may not be directly executable by the processor 928 but be configured to cause the node 900 (e.g., when compiled and executed) to perform various functions disclosed herein.

The processor 928 (e.g., having processing circuitry) may include an intelligent hardware device, e.g., a Central Processing Unit (CPU), a micro-controller, an ASIC, etc. The processor 928 may include memory. The processor 928 may process the data 930 and the instructions 932 received from the memory 934, and information transmitted and received via the transceiver 920, the baseband communications module, and/or the network communications module. The processor 928 may also process information to be sent to the transceiver 920 for transmission via the antenna 936 to the network communications module for transmission to a core network.

One or more presentation components 938 may present data indications to a person or another device. Examples of presentation components 938 may include a display device, a speaker, a printing component, and a vibrating component, etc.

In various implementations of the present disclosure, the CC may be PCell, PSCell, and/or SCell.

In various implementations of the present disclosure, the SpCell may include PCell and PSCell.

In various implementations of the present disclosure, the UL resource may be PRACH resource, PUCCH resource, and/or PUSCH resource. The UL resource may be scheduled by dynamic grant (e.g., via PDCCH) and/or configured by RRC (e.g., type 1/type 2 configured UL grant or preconfigured in RRC configuration). When a beam failure (of an SCell(s)) is detected, the UE may trigger a BFR procedure (for an SCell(s)).

In various implementations of the present disclosure, the MAC entity may be referred to the UE.

In various implementations of the present disclosure, intra-UE prioritization may be needed by a UE if two or more UL resources (scheduled/configured in the same serving cell) overlap in the time domain. As a result of intra-UE prioritization, the UE may select one of the overlapping UL resources for transmission. The selected UL resource may be referred to as a prioritized UL resource, and the MAC PDU/TB to be transmitted on the UL resource may be referred to as a prioritized MAC PDU/TB. In contrast, the UL resource(s) that is not selected may be referred to as a deprioritized UL resource(s), and the MAC PDU(s)/TB(s) to be transmitted on the deprioritized UL resource(s) may be referred to as a deprioritized MAC PDU(s)/TB(s).

In various implementations of the present disclosure, the overlap of the resource may mean partially overlap and/or fully overlap.

In various implementations of the present disclosure, the configured grant configuration may be (but is not limited to) configured grant Type 1 or configured grant Type 2.

In various implementations of the present disclosure, there are two types of transmission without dynamic grant: configured grant Type 1 where an uplink grant is provided by RRC, and stored as configured uplink grant; and configured grant Type 2 where an uplink grant is provided by PDCCH, and stored or cleared as configured uplink grant based on L1 signaling indicating configured uplink grant activation or deactivation.

In various implementations of the present disclosure, an SpCell may include PCell and PSCell.

In various implementations of the present disclosure, a UL resource may be a PRACH resource, a PUCCH resource, and/or a PUSCH resource. The UL resource may be scheduled by dynamic grant (e.g., via PDCCH) and/or configured by RRC (e.g., type 1/type 2 configured UL grant or preconfigured in RRC configuration).

In various implementations of the present disclosure, a MAC entity (or HARQ entity) may be referred to the UE.

In various implementations of the present disclosure, a PCell LBT recovery procedure and/or a PSCell LBT recovery procedure may also be termed as a SpCell LBT recovery procedure.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:
one or more non-transitory computer-readable media having computer-executable instructions embodied therein; and
at least one processor coupled to the one or more non-transitory computer-readable media, the at least one processor configured to execute the computer-executable instructions to:
receive a dynamic grant for scheduling a first uplink (UL) resource and a second UL resource, the first UL resource starting before the second UL resource in time domain, the second UL resource indicated for a new transmission;
determine whether the second UL resource is available for transmitting a first Medium Access Control (MAC) protocol data unit (PDU) when a transmission of the first MAC PDU on the first UL resource has failed; and
in a case that the second UL resource is determined to be available for transmitting the first MAC PDU, transmit the first MAC PDU using the second UL resource.

2. The UE of claim 1, wherein the at least one processor is further configured to execute the computer-executable instructions to:
in a case that the second UL resource is determined not to be available for transmitting the first MAC PDU, generate a second MAC PDU for the new transmission using the second UL resource.

3. The UE of claim 1, wherein the second UL resource is determined to be available for transmitting the first MAC PDU if the following conditions are satisfied:

the first MAC PDU is generated for the transmission using the first UL resource scheduled by the dynamic grant;

the first UL resource is indicated for a new transmission;

a size of the second UL resource is equal to or greater than a size of the first UL resource;

the transmission of the first MAC PDU on the first UL resource has failed due to a UL Listen-Before-Talk (LBT) failure; and a first hybrid automatic repeat request (HARQ) process identifier (ID) associated with the first UL resource is different from a second HARQ ID associated with the second UL resource.

4. The UE of claim 3, wherein the first MAC PDU is stored in a HARQ buffer after being generated, and the HARQ buffer is associated with a HARQ process of the first UL resource.

5. The UE of claim 4, wherein the at least one processor is further configured to execute the computer-executable instructions to:

obtain the first MAC PDU from the HARQ buffer for transmission using the second UL resource.

6. The UE of claim 1, wherein the second UL resource is immediately after the first UL resource in the time domain.

7. The UE of claim 6, wherein the first UL resource and the second UL resource are physical uplink shared channel (PUSCH) resources.

8. The UE of claim 6, wherein a size of the second UL resource is equal to or greater than a size of the first UL resource.

9. The UE of claim 1, wherein the dynamic grant is received in downlink control information (DCI).

10. A method performed by a user equipment (UE), the method comprising:

receiving a dynamic grant for scheduling a first uplink (UL) resource and a second UL resource, the first UL resource starting before the second UL resource in time domain, the second UL resource indicated for a new transmission;

determining whether the second UL resource is available for transmitting a first Medium Access Control (MAC) protocol data unit (PDU), when a transmission of the first MAC PDU on the first UL resource has failed; and in a case that the second UL resource is determined to be available for transmitting the first MAC PDU, transmitting the first MAC PDU using the second UL resource.

11. The method of claim 10, wherein in a case that the second UL resource is determined not to be available for transmitting the first MAC PDU, generating a second MAC PDU for the new transmission using the second UL resource.

12. The method of claim 10, wherein the second UL resource is available for the transmission of the first MAC PDU if the following conditions are satisfied:

the first MAC PDU is generated for the transmission using the first UL resource scheduled by the dynamic grant;

the first UL resource is indicated for a new transmission;

a size of the second UL resource is equal to or greater than a size of the first UL resource;

the transmission of the first MAC PDU on the first UL resource has failed due to a UL Listen-Before-Talk (LBT) failure; and a first hybrid automatic repeat request (HARQ) process identifier (ID) associated with the first UL resource is different from a second HARQ ID associated with the second UL resource.

13. The method of claim 12, wherein the first MAC PDU is stored in a HARQ buffer after being generated, and the HARQ buffer is associated with a HARQ process of the first UL resource.

14. The method of claim 13, further comprising:

obtaining the first MAC PDU from the HARQ buffer for transmission using the second UL resource.

15. The method of claim 10, wherein the second UL resource is immediately after the first UL resource in the time domain.

16. The method of claim 15, wherein the first UL resource and the second UL resource are physical uplink shared channel (PUSCH) resources.

17. The method of claim 15, wherein a size of the second UL resource is equal to or greater than a size of the first UL resource.

18. The method of claim 10, wherein the dynamic grant is received in downlink control information (DCI).

* * * * *